(12) United States Patent
Graham et al.

(10) Patent No.: US 9,058,331 B2
(45) Date of Patent: Jun. 16, 2015

(54) GENERATING A CONVERSATION IN A SOCIAL NETWORK BASED ON VISUAL SEARCH RESULTS

(75) Inventors: Jamey Graham, San Jose, CA (US); Timothee Bailloeul, Sunnyvale, CA (US); Dani Essindi, Menlo Park, CA (US)

(73) Assignee: Ricoh Co., Ltd., Tokyo (JP)

(*) Notice: Subject to any disclaimer, the term of this patent is extended or adjusted under 35 U.S.C. 154(b) by 0 days.

(21) Appl. No.: 13/192,458

(22) Filed: Jul. 27, 2011
(Under 37 CFR 1.47)

(65) Prior Publication Data
US 2013/0031125 A1 Jan. 31, 2013

(51) Int. Cl.
*G06F 17/30* (2006.01)
(52) U.S. Cl.
CPC ................... *G06F 17/3005* (2013.01)
(58) Field of Classification Search
CPC .......... G06F 17/3089; G06F 17/30265; G06F 17/30277
See application file for complete search history.

(56) References Cited

U.S. PATENT DOCUMENTS

| | | | |
|---|---|---|---|
| 1,915,993 A | 6/1933 | Handel | |
| 4,759,075 A | 7/1988 | Lipkie et al. | |
| 5,010,581 A | 4/1991 | Kanno | |
| 5,027,421 A | 6/1991 | Kanno | |
| 5,077,805 A | 12/1991 | Tan | |
| 5,109,439 A | 4/1992 | Froessl | |
| 5,263,100 A | 11/1993 | Kim et al. | |
| 5,392,447 A | 2/1995 | Schlack et al. | |
| 5,416,892 A | 5/1995 | Loken-Kim | |
| 5,432,864 A | 7/1995 | Lu et al. | |
| 5,465,353 A | 11/1995 | Hull et al. | |
| 5,546,502 A | 8/1996 | Hart et al. | |
| 5,553,217 A | 9/1996 | Hart et al. | |
| 5,555,556 A | 9/1996 | Ozaki | |
| 5,579,471 A | 11/1996 | Barber et al. | |
| 5,706,097 A | 1/1998 | Schelling et al. | |

(Continued)

FOREIGN PATENT DOCUMENTS

| | | |
|---|---|---|
| CN | 1245935 | 3/2000 |
| EP | 0706283 | 4/1996 |

(Continued)

OTHER PUBLICATIONS

Hirokazu Kate et al., A Registration Method for Augmented Reality based on Matching Templates Generated from Texture Image, Transaction for the Virtual Reality Society of Japan, The Virtual Reality Society of Japan, 2002, vol. 7, No. 2, pp. 119-128.

(Continued)

*Primary Examiner* — Anh Tai Tran
(74) *Attorney, Agent, or Firm* — Patent Law Works LLP

(57) ABSTRACT

The present invention includes a system and method for generating a conversation in a social network based on visual search results. A mixed media reality (MMR) engine indexes source materials as MMR objects, receives images from a user device and identifies matching MMR objects. A content management engine generates metadata corresponding to the MMR objects. A social network application generates conversations corresponding to the MMR object. The conversation includes multiple discussion threads. If a conversation already exists, the social network application provides the user with access to the conversation.

20 Claims, 20 Drawing Sheets

(56) References Cited

U.S. PATENT DOCUMENTS

| | | |
|---|---|---|
| 5,752,055 A | 5/1998 | Repath |
| 5,754,772 A | 5/1998 | Leaf |
| 5,757,953 A | 5/1998 | Jang |
| 5,761,344 A | 6/1998 | Al-Hussein |
| 5,764,277 A | 6/1998 | Loui et al. |
| 5,806,005 A | 9/1998 | Hull et al. |
| 5,832,474 A | 11/1998 | Lopresti et al. |
| 5,832,530 A | 11/1998 | Paknad et al. |
| 5,842,194 A | 11/1998 | Arbuckle |
| 5,848,184 A | 12/1998 | Taylor et al. |
| 5,867,597 A | 2/1999 | Peairs et al. |
| 5,873,077 A | 2/1999 | Kanoh et al. |
| 5,889,886 A | 3/1999 | Mahoney |
| 5,892,843 A | 4/1999 | Zhou et al. |
| 5,905,502 A | 5/1999 | Deering |
| 5,907,835 A | 5/1999 | Yokomizo et al. |
| 5,918,012 A | 6/1999 | Astiz et al. |
| 5,933,525 A | 8/1999 | Makhoul et al. |
| 5,933,823 A | 8/1999 | Cullen |
| 5,956,468 A | 9/1999 | Ancin |
| 5,968,175 A | 10/1999 | Morishita et al. |
| 5,999,664 A | 12/1999 | Mahoney et al. |
| 5,999,915 A | 12/1999 | Nahan et al. |
| 6,006,240 A | 12/1999 | Handley |
| 6,026,411 A | 2/2000 | Delp |
| 6,035,055 A | 3/2000 | Wang et al. |
| 6,104,834 A | 8/2000 | Hull |
| 6,121,969 A | 9/2000 | Jain et al. |
| 6,138,129 A | 10/2000 | Combs |
| 6,192,157 B1 | 2/2001 | Prebble |
| 6,208,771 B1 | 3/2001 | Jared et al. |
| 6,223,171 B1 | 4/2001 | Chaudhuri et al. |
| 6,253,201 B1 | 6/2001 | Abdel-Mottaleb |
| 6,301,386 B1 | 10/2001 | Zhu et al. |
| 6,332,039 B1 | 12/2001 | Bando et al. |
| 6,345,274 B1 | 2/2002 | Zhu et al. |
| 6,353,822 B1 | 3/2002 | Lieberman |
| 6,363,381 B1 | 3/2002 | Lee et al. |
| 6,393,142 B1 | 5/2002 | Swain et al. |
| 6,397,213 B1 | 5/2002 | Cullen et al. |
| 6,404,925 B1 | 6/2002 | Foote et al. |
| 6,405,172 B1 | 6/2002 | Baker et al. |
| 6,408,257 B1 | 6/2002 | Harrington et al. |
| 6,411,953 B1 | 6/2002 | Ganapathy et al. |
| 6,430,312 B1 | 8/2002 | Huang et al. |
| 6,445,834 B1 | 9/2002 | Rising, III |
| 6,448,979 B1 | 9/2002 | Schena et al. |
| 6,457,026 B1 | 9/2002 | Graham et al. |
| 6,460,036 B1 | 10/2002 | Herz |
| 6,470,264 B2 | 10/2002 | Bide |
| 6,504,571 B1 | 1/2003 | Narayanaswami et al. |
| 6,537,324 B1 | 3/2003 | Tabata et al. |
| 6,567,799 B2 | 5/2003 | Sweet et al. |
| 6,574,375 B1 | 6/2003 | Cullen et al. |
| 6,574,644 B2 | 6/2003 | Hsu et al. |
| 6,584,223 B1 | 6/2003 | Shiiyama |
| 6,611,862 B2 | 8/2003 | Riesman |
| 6,686,970 B1 | 2/2004 | Windle |
| 6,693,649 B1 | 2/2004 | Lipscomb et al. |
| 6,732,915 B1 | 5/2004 | Nelson et al. |
| 6,751,343 B1 | 6/2004 | Ferrell et al. |
| 6,753,883 B2 | 6/2004 | Schena et al. |
| 6,766,363 B1 | 7/2004 | Rothschild |
| 6,791,605 B1 | 9/2004 | Reele et al. |
| 6,799,201 B1 | 9/2004 | Lee et al. |
| 6,804,332 B1 | 10/2004 | Miner et al. |
| 6,804,659 B1 | 10/2004 | Graham et al. |
| 6,813,381 B2 | 11/2004 | Ohnishi et al. |
| 6,824,057 B2 | 11/2004 | Rathus et al. |
| 6,827,267 B2 | 12/2004 | Rathus et al. |
| 6,830,187 B2 | 12/2004 | Rathus et al. |
| 6,834,804 B2 | 12/2004 | Rathus et al. |
| 6,842,755 B2 | 1/2005 | Maslov |
| 6,843,411 B2 | 1/2005 | Rathus et al. |
| 6,859,909 B1 | 2/2005 | Lerner et al. |
| 6,865,302 B2 | 3/2005 | Chang |
| 6,866,196 B1 | 3/2005 | Rathus et al. |
| 6,874,131 B2 | 3/2005 | Blumberg |
| 6,922,699 B2 | 7/2005 | Schuetze et al. |
| 6,929,182 B2 | 8/2005 | Rathus et al. |
| 6,940,491 B2 | 9/2005 | Incertis Carro |
| 6,958,821 B1 | 10/2005 | McIntyre |
| 6,963,358 B2 | 11/2005 | Cohen et al. |
| 6,964,374 B1 | 11/2005 | Djuknic et al. |
| 6,980,962 B1 | 12/2005 | Arganbright et al. |
| 6,981,224 B1 | 12/2005 | Gardner et al. |
| 6,993,573 B2 | 1/2006 | Hunter |
| 6,999,204 B2 | 2/2006 | Mortenson et al. |
| 7,013,309 B2 | 3/2006 | Chakraborty et al. |
| 7,031,965 B1 | 4/2006 | Moriya et al. |
| 7,035,467 B2 | 4/2006 | Nicponski |
| 7,051,086 B2 | 5/2006 | Rhoads et al. |
| 7,054,489 B2 | 5/2006 | Yamaoka et al. |
| 7,062,722 B1 | 6/2006 | Carlin et al. |
| 7,089,487 B2 | 8/2006 | Tsai |
| 7,092,953 B1 | 8/2006 | Haynes |
| 7,134,095 B1 | 11/2006 | Smith et al. |
| 7,136,093 B1 | 11/2006 | Itoh et al. |
| 7,150,021 B1 | 12/2006 | Vajjhala et al. |
| 7,150,399 B2 | 12/2006 | Barrus et al. |
| 7,167,574 B2 | 1/2007 | Kim et al. |
| 7,174,031 B2 | 2/2007 | Rhoads et al. |
| 7,185,274 B1 | 2/2007 | Rubin et al. |
| 7,206,820 B1 | 4/2007 | Rhoads et al. |
| 7,213,101 B1 | 5/2007 | Srinivasan et al. |
| 7,232,057 B2 | 6/2007 | Rathus et al. |
| 7,236,632 B2 | 6/2007 | Erol et al. |
| 7,239,402 B2 | 7/2007 | Soler et al. |
| 7,240,279 B1 | 7/2007 | Chartier et al. |
| 7,249,123 B2 | 7/2007 | Elder et al. |
| 7,251,689 B2 | 7/2007 | Wesley |
| 7,263,205 B2 | 8/2007 | Lev |
| 7,281,199 B1 | 10/2007 | Nicol et al. |
| 7,305,435 B2 | 12/2007 | Hamynen |
| 7,310,769 B1 | 12/2007 | Dash |
| 7,310,779 B2 | 12/2007 | Carro |
| 7,359,094 B1 | 4/2008 | Sayuda |
| 7,363,580 B2 | 4/2008 | Tabata et al. |
| 7,366,979 B2 | 4/2008 | Spielberg et al. |
| 7,379,627 B2 | 5/2008 | Li et al. |
| 7,386,789 B2 | 6/2008 | Chao et al. |
| 7,392,287 B2 | 6/2008 | Ratcliff, III |
| 7,403,642 B2 | 7/2008 | Zhang et al. |
| 7,406,214 B2 | 7/2008 | Rhoads et al. |
| 7,421,153 B1 | 9/2008 | Ronca et al. |
| 7,421,155 B2 | 9/2008 | King et al. |
| 7,424,541 B2 | 9/2008 | Bourne |
| 7,437,023 B2 | 10/2008 | King et al. |
| 7,450,760 B2 | 11/2008 | Molnar et al. |
| 7,457,825 B2 | 11/2008 | Li et al. |
| 7,458,014 B1 | 11/2008 | Rubin et al. |
| 7,463,270 B2 | 12/2008 | Vale et al. |
| 7,489,415 B2 | 2/2009 | Furuta |
| 7,509,386 B2 | 3/2009 | Miyashita |
| 7,546,524 B1 | 6/2009 | Bryar et al. |
| 7,551,780 B2 | 6/2009 | Nudd et al. |
| 7,567,262 B1 | 7/2009 | Clemens et al. |
| 7,585,224 B2 | 9/2009 | Dyke-Wells |
| 7,587,681 B2 | 9/2009 | Kake et al. |
| 7,593,605 B2 | 9/2009 | King et al. |
| 7,593,961 B2 | 9/2009 | Eguchi et al. |
| 7,613,686 B2 | 11/2009 | Rui |
| 7,623,259 B2 | 11/2009 | Tojo |
| 7,643,705 B1 | 1/2010 | Erol |
| 7,647,331 B2 | 1/2010 | Li et al. |
| 7,653,238 B2 | 1/2010 | Stentiford |
| 7,668,405 B2 | 2/2010 | Gallagher |
| 7,676,767 B2 | 3/2010 | Hofmeister et al. |
| 7,683,933 B2 | 3/2010 | Tanaka |
| 7,684,622 B2 | 3/2010 | Fisher et al. |
| 7,702,673 B2 | 4/2010 | Hull |
| 7,702,681 B2 | 4/2010 | Brewer |
| 7,707,039 B2 | 4/2010 | King et al. |
| 7,725,508 B2 | 5/2010 | Lawarence et al. |

(56) References Cited

U.S. PATENT DOCUMENTS

| | | |
|---|---|---|
| 7,742,953 B2 | 6/2010 | King et al. |
| 7,746,376 B2 | 6/2010 | Mendoza et al. |
| 7,752,534 B2 | 7/2010 | Blanchard et al. |
| 7,761,436 B2 | 7/2010 | Norton et al. |
| 7,765,231 B2 | 7/2010 | Rathus et al. |
| 7,779,355 B1 | 8/2010 | Erol et al. |
| 7,801,845 B1 * | 9/2010 | King et al. .................... 707/608 |
| 7,809,192 B2 | 10/2010 | Gokurk et al. |
| 7,812,986 B2 | 10/2010 | Graham et al. |
| 7,872,669 B2 | 1/2011 | Darrell et al. |
| 7,882,177 B2 | 2/2011 | Wei et al. |
| 7,885,955 B2 | 2/2011 | Hull |
| 7,894,684 B2 | 2/2011 | Monobe et al. |
| 7,917,554 B2 | 3/2011 | Hull |
| 7,920,759 B2 | 4/2011 | Hull |
| 7,930,292 B2 | 4/2011 | Nakajima |
| 7,946,491 B2 | 5/2011 | Burian et al. |
| 7,991,778 B2 | 8/2011 | Hull |
| 8,005,831 B2 | 8/2011 | Hull |
| 8,073,263 B2 | 12/2011 | Hull |
| 8,086,038 B2 | 12/2011 | Ke |
| 8,144,921 B2 | 3/2012 | Ke |
| 8,156,115 B1 | 4/2012 | Erol |
| 8,156,116 B2 | 4/2012 | Graham |
| 8,156,427 B2 | 4/2012 | Graham |
| 8,176,054 B2 | 5/2012 | Moraleda |
| 8,184,155 B2 | 5/2012 | Ke |
| 8,195,659 B2 | 6/2012 | Hull |
| 8,276,088 B2 | 9/2012 | Ke et al. |
| 8,326,037 B1 | 12/2012 | Abitz et al. |
| 8,332,401 B2 | 12/2012 | Hull et al. |
| 8,335,789 B2 | 12/2012 | Hull et al. |
| 8,369,655 B2 | 2/2013 | Moraleda et al. |
| 8,385,589 B2 | 2/2013 | Erol et al. |
| 8,385,660 B2 | 2/2013 | Moraleda et al. |
| 8,386,336 B1 | 2/2013 | Fox et al. |
| 8,600,989 B2 | 12/2013 | Hull et al. |
| 8,612,475 B2 | 12/2013 | Graham et al. |
| 8,676,810 B2 | 3/2014 | Moraleda |
| 8,825,682 B2 | 9/2014 | Kishi et al. |
| 8,838,591 B2 | 9/2014 | Hull et al. |
| 8,856,108 B2 | 10/2014 | Erol et al. |
| 8,868,555 B2 | 10/2014 | Erol et al. |
| 8,892,595 B2 | 11/2014 | Graham et al. |
| 8,965,145 B2 | 2/2015 | Moraleda et al. |
| 8,989,431 B1 | 3/2015 | Erol et al. |
| 2001/0011276 A1 | 8/2001 | Durst, Jr. et al. |
| 2001/0013546 A1 | 8/2001 | Ross |
| 2001/0024514 A1 | 9/2001 | Matsunaga |
| 2001/0042030 A1 | 11/2001 | Ito et al. |
| 2001/0042085 A1 | 11/2001 | Peairs et al. |
| 2001/0043741 A1 | 11/2001 | Mahoney et al. |
| 2001/0047373 A1 | 11/2001 | Jones |
| 2001/0049700 A1 | 12/2001 | Ichikura |
| 2002/0008697 A1 | 1/2002 | Deering |
| 2002/0029232 A1 | 3/2002 | Bobrow et al. |
| 2002/0038430 A1 | 3/2002 | Edwards et al. |
| 2002/0052872 A1 | 5/2002 | Yada |
| 2002/0054059 A1 | 5/2002 | Schneiderman |
| 2002/0063709 A1 | 5/2002 | Gilbert et al. |
| 2002/0069418 A1 | 6/2002 | Philips |
| 2002/0073236 A1 | 6/2002 | Helgeson et al. |
| 2002/0093538 A1 | 7/2002 | Carlin |
| 2002/0102966 A1 | 8/2002 | Lev et al. |
| 2002/0118379 A1 | 8/2002 | Chakraborty |
| 2002/0126905 A1 | 9/2002 | Suzuki et al. |
| 2002/0129057 A1 | 9/2002 | Spielberg |
| 2002/0131641 A1 | 9/2002 | Luo et al. |
| 2002/0146176 A1 | 10/2002 | Meyers |
| 2002/0154148 A1 | 10/2002 | Inoue et al. |
| 2002/0157028 A1 | 10/2002 | Koue et al. |
| 2002/0159640 A1 | 10/2002 | Vaithillingam et al. |
| 2002/0161747 A1 | 10/2002 | Li et al. |
| 2002/0191003 A1 | 12/2002 | Hobgood et al. |
| 2002/0191848 A1 | 12/2002 | Boose et al. |
| 2002/0194264 A1 | 12/2002 | Uchiyama et al. |
| 2002/0198789 A1 | 12/2002 | Waldman |
| 2003/0012428 A1 | 1/2003 | Syeda-Mahmood |
| 2003/0025714 A1 | 2/2003 | Ebersole et al. |
| 2003/0030828 A1 | 2/2003 | Soler et al. |
| 2003/0030835 A1 | 2/2003 | Yoshida et al. |
| 2003/0063319 A1 | 4/2003 | Umeda et al. |
| 2003/0069932 A1 | 4/2003 | Hall et al. |
| 2003/0098877 A1 | 5/2003 | Boegelund |
| 2003/0110216 A1 | 6/2003 | Althin et al. |
| 2003/0112930 A1 | 6/2003 | Bosik et al. |
| 2003/0121006 A1 | 6/2003 | Tabata et al. |
| 2003/0122922 A1 | 7/2003 | Saffer et al. |
| 2003/0126147 A1 | 7/2003 | Essafi et al. |
| 2003/0128375 A1 | 7/2003 | Ruhl et al. |
| 2003/0142106 A1 | 7/2003 | Saund et al. |
| 2003/0151674 A1 | 8/2003 | Lin |
| 2003/0152293 A1 | 8/2003 | Bresler et al. |
| 2003/0169910 A1 | 9/2003 | Reisman et al. |
| 2003/0179230 A1 | 9/2003 | Seidman |
| 2003/0187886 A1 | 10/2003 | Hull et al. |
| 2003/0190094 A1 | 10/2003 | Yokota |
| 2003/0193530 A1 | 10/2003 | Blackman et al. |
| 2003/0195883 A1 | 10/2003 | Mojsilovic et al. |
| 2003/0212585 A1 | 11/2003 | Kyoya et al. |
| 2004/0012569 A1 | 1/2004 | Hara |
| 2004/0015495 A1 | 1/2004 | Kim et al. |
| 2004/0017482 A1 | 1/2004 | Weitman |
| 2004/0027604 A1 | 2/2004 | Jeran et al. |
| 2004/0036679 A1 | 2/2004 | Emerson |
| 2004/0042667 A1 | 3/2004 | Lee et al. |
| 2004/0102898 A1 | 5/2004 | Yokota |
| 2004/0122811 A1 | 6/2004 | Page |
| 2004/0133582 A1 | 7/2004 | Howard et al. |
| 2004/0139391 A1 | 7/2004 | Stumbo et al. |
| 2004/0143644 A1 | 7/2004 | Berton et al. |
| 2004/0198396 A1 | 10/2004 | Fransioli |
| 2004/0199531 A1 | 10/2004 | Kim et al. |
| 2004/0201706 A1 | 10/2004 | Shimizu et al. |
| 2004/0205347 A1 | 10/2004 | Erol et al. |
| 2004/0205466 A1 | 10/2004 | Kuppinger et al. |
| 2004/0215689 A1 | 10/2004 | Dooley et al. |
| 2004/0220898 A1 | 11/2004 | Eguchi et al. |
| 2004/0221244 A1 | 11/2004 | Baldino |
| 2004/0233235 A1 | 11/2004 | Rubin et al. |
| 2004/0238621 A1 | 12/2004 | Beenau et al. |
| 2004/0243514 A1 | 12/2004 | Wankmueller |
| 2004/0260625 A1 | 12/2004 | Usami et al. |
| 2004/0260680 A1 | 12/2004 | Best et al. |
| 2004/0264780 A1 | 12/2004 | Zhang |
| 2005/0012960 A1 | 1/2005 | Eden et al. |
| 2005/0021478 A1 | 1/2005 | Gautier et al. |
| 2005/0080627 A1 | 4/2005 | Hennebert et al. |
| 2005/0080693 A1 | 4/2005 | Foss et al. |
| 2005/0080871 A1 | 4/2005 | Dinh et al. |
| 2005/0084154 A1 | 4/2005 | Li et al. |
| 2005/0086188 A1 | 4/2005 | Hilis et al. |
| 2005/0086224 A1 | 4/2005 | Franciosa et al. |
| 2005/0088684 A1 | 4/2005 | Naito et al. |
| 2005/0089246 A1 | 4/2005 | Luo |
| 2005/0097435 A1 | 5/2005 | Prakash et al. |
| 2005/0100219 A1 | 5/2005 | Berkner et al. |
| 2005/0108406 A1 | 5/2005 | Lee et al. |
| 2005/0114325 A1 | 5/2005 | Liu et al. |
| 2005/0125390 A1 | 6/2005 | Hurst-Hiller et al. |
| 2005/0129293 A1 | 6/2005 | Acharya et al. |
| 2005/0135483 A1 | 6/2005 | Nair |
| 2005/0160115 A1 | 7/2005 | Starkweather |
| 2005/0160258 A1 | 7/2005 | O'Shea et al. |
| 2005/0165747 A1 | 7/2005 | Bargeron et al. |
| 2005/0165784 A1 | 7/2005 | Gomez et al. |
| 2005/0169520 A1 | 8/2005 | Chen et al. |
| 2005/0182773 A1 | 8/2005 | Feinsmith |
| 2005/0185060 A1 | 8/2005 | Neven |
| 2005/0185225 A1 | 8/2005 | Brawn et al. |
| 2005/0187768 A1 | 8/2005 | Godden |
| 2005/0190273 A1 | 9/2005 | Toyama et al. |
| 2005/0190972 A1 | 9/2005 | Thomas et al. |
| 2005/0216257 A1 | 9/2005 | Tanabe et al. |

(56) References Cited

U.S. PATENT DOCUMENTS

| | | |
|---|---|---|
| 2005/0234851 A1 | 10/2005 | King et al. |
| 2005/0240381 A1 | 10/2005 | Seiler et al. |
| 2005/0256866 A1 | 11/2005 | Lu et al. |
| 2005/0261990 A1 | 11/2005 | Gocht et al. |
| 2005/0273812 A1 | 12/2005 | Sakai |
| 2005/0288859 A1 | 12/2005 | Golding et al. |
| 2005/0288911 A1 | 12/2005 | Porikli |
| 2005/0289182 A1 | 12/2005 | Pandian et al. |
| 2005/0289447 A1 | 12/2005 | Hadley et al. |
| 2006/0002607 A1 | 1/2006 | Boncyk |
| 2006/0012677 A1 | 1/2006 | Neven et al. |
| 2006/0014317 A1 | 1/2006 | Farnworth |
| 2006/0020630 A1 | 1/2006 | Stager et al. |
| 2006/0023945 A1 | 2/2006 | King et al. |
| 2006/0041605 A1 | 2/2006 | King et al. |
| 2006/0043188 A1 | 3/2006 | Kricorissian |
| 2006/0047639 A1 | 3/2006 | King et al. |
| 2006/0048059 A1 | 3/2006 | Etkin |
| 2006/0053097 A1 | 3/2006 | King et al. |
| 2006/0053101 A1 | 3/2006 | Stuart et al. |
| 2006/0056696 A1 | 3/2006 | Jun et al. |
| 2006/0056697 A1 | 3/2006 | Jun et al. |
| 2006/0061806 A1 | 3/2006 | King et al. |
| 2006/0070120 A1 | 3/2006 | Aoki et al. |
| 2006/0080286 A1 | 4/2006 | Svendsen |
| 2006/0082438 A1 | 4/2006 | Bazakos et al. |
| 2006/0085477 A1 | 4/2006 | Phillips et al. |
| 2006/0085735 A1 | 4/2006 | Shimizu |
| 2006/0104515 A1 | 5/2006 | King et al. |
| 2006/0112092 A1 | 5/2006 | Ziou et al. |
| 2006/0114485 A1 | 6/2006 | Sato |
| 2006/0116555 A1 | 6/2006 | Pavlidis et al. |
| 2006/0119880 A1 | 6/2006 | Dandekar et al. |
| 2006/0122884 A1 | 6/2006 | Graham et al. |
| 2006/0122983 A1 | 6/2006 | King et al. |
| 2006/0123347 A1 | 6/2006 | Hewitt et al. |
| 2006/0140475 A1 | 6/2006 | Chin et al. |
| 2006/0140614 A1 | 6/2006 | Kim et al. |
| 2006/0143176 A1 | 6/2006 | Mojsilovic et al. |
| 2006/0147107 A1 | 7/2006 | Zhang et al. |
| 2006/0150079 A1 | 7/2006 | Albornoz et al. |
| 2006/0190812 A1 | 8/2006 | Elienby et al. |
| 2006/0192997 A1 | 8/2006 | Matsumoto et al. |
| 2006/0200347 A1 | 9/2006 | Kim et al. |
| 2006/0200480 A1 | 9/2006 | Harris et al. |
| 2006/0206335 A1 | 9/2006 | Thelen et al. |
| 2006/0218225 A1 | 9/2006 | Hee Voon et al. |
| 2006/0227992 A1 | 10/2006 | Rathus et al. |
| 2006/0240862 A1 | 10/2006 | Neven et al. |
| 2006/0251292 A1 | 11/2006 | Gokturk et al. |
| 2006/0251339 A1 | 11/2006 | Gokturk et al. |
| 2006/0253439 A1 | 11/2006 | Ren et al. |
| 2006/0253491 A1 | 11/2006 | Gokturk et al. |
| 2006/0262352 A1 | 11/2006 | Hull et al. |
| 2006/0262962 A1 | 11/2006 | Hull et al. |
| 2006/0262976 A1 | 11/2006 | Hart et al. |
| 2006/0264209 A1 | 11/2006 | Atkinson et al. |
| 2006/0285172 A1 | 12/2006 | Hull et al. |
| 2006/0285755 A1 | 12/2006 | Hager et al. |
| 2006/0285772 A1 | 12/2006 | Hull et al. |
| 2006/0286951 A1 | 12/2006 | Nagamoto et al. |
| 2006/0294049 A1 | 12/2006 | Sechrest et al. |
| 2006/0294094 A1 | 12/2006 | King |
| 2007/0003147 A1 | 1/2007 | Viola et al. |
| 2007/0003166 A1 | 1/2007 | Berkner |
| 2007/0006129 A1 | 1/2007 | Cieslak et al. |
| 2007/0019261 A1 | 1/2007 | Chu |
| 2007/0036469 A1 | 2/2007 | Kim et al. |
| 2007/0041642 A1 | 2/2007 | Romanoff et al. |
| 2007/0041668 A1 | 2/2007 | Todaka |
| 2007/0047819 A1 | 3/2007 | Hull et al. |
| 2007/0052997 A1 | 3/2007 | Hull et al. |
| 2007/0053513 A1 | 3/2007 | Hoffberg |
| 2007/0063050 A1 | 3/2007 | Attia et al. |
| 2007/0076922 A1 | 4/2007 | Living et al. |
| 2007/0078846 A1 | 4/2007 | Gulli et al. |
| 2007/0106721 A1 | 5/2007 | Scholter |
| 2007/0115373 A1 | 5/2007 | Gallagher et al. |
| 2007/0118794 A1 | 5/2007 | Hollander et al. |
| 2007/0150466 A1 | 6/2007 | Brave et al. |
| 2007/0165904 A1 | 7/2007 | Nudd et al. |
| 2007/0174269 A1 | 7/2007 | Jing et al. |
| 2007/0175998 A1 | 8/2007 | Lev |
| 2007/0233613 A1 | 10/2007 | Barrus et al. |
| 2007/0236712 A1 | 10/2007 | Li |
| 2007/0237426 A1 | 10/2007 | Xie et al. |
| 2007/0242626 A1 | 10/2007 | Altberg |
| 2007/0271247 A1 | 11/2007 | Best et al. |
| 2007/0276845 A1 | 11/2007 | Geilich |
| 2007/0300142 A1 | 12/2007 | King |
| 2008/0004944 A1 | 1/2008 | Calabria |
| 2008/0009268 A1 | 1/2008 | Ramer et al. |
| 2008/0010605 A1 | 1/2008 | Frank |
| 2008/0037043 A1 | 2/2008 | Hull et al. |
| 2008/0059419 A1 | 3/2008 | Auerbach et al. |
| 2008/0071767 A1 | 3/2008 | Grieselhuber et al. |
| 2008/0071929 A1 | 3/2008 | Motte et al. |
| 2008/0078836 A1 | 4/2008 | Tomita |
| 2008/0106594 A1 | 5/2008 | Thurn |
| 2008/0141117 A1 | 6/2008 | King |
| 2008/0177541 A1 | 7/2008 | Satomura |
| 2008/0229192 A1 | 9/2008 | Gear et al. |
| 2008/0267504 A1 | 10/2008 | Schloter et al. |
| 2008/0275881 A1 | 11/2008 | Conn et al. |
| 2008/0288476 A1 | 11/2008 | Kim et al. |
| 2008/0296362 A1 | 12/2008 | Lubow |
| 2008/0310717 A1 | 12/2008 | Saathoff et al. |
| 2008/0317383 A1 | 12/2008 | Franz et al. |
| 2009/0016564 A1 | 1/2009 | Ke et al. |
| 2009/0016604 A1 | 1/2009 | Ket et al. |
| 2009/0016615 A1 | 1/2009 | Hull et al. |
| 2009/0019402 A1 | 1/2009 | Ke et al. |
| 2009/0059922 A1 | 3/2009 | Appelman |
| 2009/0063431 A1 | 3/2009 | Erol et al. |
| 2009/0067726 A1 | 3/2009 | Erol et al. |
| 2009/0070110 A1 | 3/2009 | Erol et al. |
| 2009/0070302 A1 | 3/2009 | Moraleda et al. |
| 2009/0070415 A1 | 3/2009 | Kishi et al. |
| 2009/0074300 A1 | 3/2009 | Hull et al. |
| 2009/0076996 A1 | 3/2009 | Hull et al. |
| 2009/0080800 A1 | 3/2009 | Moraleda et al. |
| 2009/0092287 A1 | 4/2009 | Moraleda et al. |
| 2009/0100048 A1 | 4/2009 | Hull et al. |
| 2009/0100334 A1 | 4/2009 | Hull et al. |
| 2009/0152357 A1 | 6/2009 | Lei et al. |
| 2009/0228126 A1 | 9/2009 | Spielberg et al. |
| 2009/0235187 A1 | 9/2009 | Kim et al. |
| 2009/0248665 A1* | 10/2009 | Garg et al. .................... 707/5 |
| 2009/0254643 A1 | 10/2009 | Terheggen et al. |
| 2009/0265761 A1 | 10/2009 | Evanitsky |
| 2009/0285444 A1 | 11/2009 | Erol et al. |
| 2010/0013615 A1 | 1/2010 | Hebert et al. |
| 2010/0040296 A1 | 2/2010 | Ma et al. |
| 2010/0042511 A1 | 2/2010 | Sundaresan et al. |
| 2010/0046842 A1 | 2/2010 | Conwell |
| 2010/0057556 A1 | 3/2010 | Rousso et al. |
| 2010/0063961 A1 | 3/2010 | Guiheneuf et al. |
| 2010/0174783 A1 | 7/2010 | Zarom |
| 2010/0211567 A1 | 8/2010 | Abir |
| 2010/0306273 A1 | 12/2010 | Branigan et al. |
| 2011/0035384 A1 | 2/2011 | Qiu |
| 2011/0121069 A1 | 5/2011 | Lindahl et al. |
| 2011/0167064 A1 | 7/2011 | Achtermann et al. |
| 2011/0173521 A1 | 7/2011 | Horton et al. |
| 2011/0314031 A1* | 12/2011 | Chittar et al. ............... 707/749 |
| 2012/0166435 A1 | 6/2012 | Graham |
| 2012/0173504 A1 | 7/2012 | Moraleda |
| 2013/0027428 A1 | 1/2013 | Graham et al. |
| 2013/0031100 A1 | 1/2013 | Graham et al. |

FOREIGN PATENT DOCUMENTS

| | | |
|---|---|---|
| EP | 1229496 | 8/2002 |
| EP | 1555626 | 7/2005 |

(56) References Cited

FOREIGN PATENT DOCUMENTS

| | | |
|---|---|---|
| EP | 1662064 | 5/2006 |
| EP | 1783681 | 5/2007 |
| JP | 09-006961 | 1/1997 |
| JP | 9134372 | 5/1997 |
| JP | 10-228468 | 8/1998 |
| JP | 10-0240765 | 9/1998 |
| JP | 11-234560 | 8/1999 |
| JP | 2000-165645 | 6/2000 |
| JP | 2000-268179 | 9/2000 |
| JP | 2001-211359 | 8/2001 |
| JP | 2001-230916 | 8/2001 |
| JP | 2001-265811 | 9/2001 |
| JP | 2002-513480 | 5/2002 |
| JP | 2002521752 | 7/2002 |
| JP | 2003-178081 | 6/2003 |
| JP | 2004-055658 | 2/2004 |
| JP | 2004234656 | 8/2004 |
| JP | 2005-011005 | 1/2005 |
| JP | 2005100274 | 4/2005 |
| JP | 2005157931 | 6/2005 |
| JP | 2005-242579 | 9/2005 |
| JP | 2005-286395 | 10/2005 |
| JP | 2006-053568 | 2/2006 |
| JP | 2006-059351 | 3/2006 |
| JP | 2006-229465 | 8/2006 |
| JP | 2006-6215756 | 8/2006 |
| JP | 2007-072573 | 3/2007 |
| JP | 2007-140613 | 6/2007 |
| JP | 2007-174270 | 7/2007 |
| JP | 2007264992 | 10/2007 |
| JP | 2008-158823 | 7/2008 |
| WO | WO99/05658 | 2/1999 |
| WO | WO00/05663 | 2/2000 |
| WO | WO2004/072897 | 8/2004 |
| WO | WO2005/043270 | 5/2005 |
| WO | WO2006/092957 | 9/2006 |
| WO | 2007023994 | 3/2007 |
| WO | WO2007/073347 | 6/2007 |
| WO | WO2008/129373 | 10/2008 |

OTHER PUBLICATIONS

Japanese Office Action, JP2008-180790, dated May 22, 2012, 3 pages.
Japanese Office Action, JP2008-180791, dated May 22, 2012, 4 pages.
Japanese Office Action, JP2008-180792, dated May 22, 2012, 3 pages.
Japanese Office Action, JP2008-180793, dated May 29, 2012, 3 pages.
Japanese Office Action, JP2008-180794, dated May 22, 2012, 3 pages.
United States Final Office Action, U.S. Appl. No. 12/247,205, dated May 23, 2012, 50 pages.
United States Final Office Action, U.S. Appl. No. 12/210,532, dated Jun. 5, 2012, 48 pages.
United States Non-Final Office Action, U.S. Appl. No. 11/461,037, dated Jun. 13, 2012, 46 pages.
United States Final Office Action, U.S. Appl. No. 12/240,596, dated Jun. 14, 2012, 28 pages.
United States Non-Final Office Action, U.S. Appl. No. 12/340,124, dated Jun. 27, 2012, 31 pages.
United States Final Office Action, U.S. Appl. No. 12/210,519, dated Jun. 28, 2012, 33 pages.
United States Final Office Action, U.S. Appl. No. 12/491,018, dated Jun. 28, 2012, 64 pages.
United States Final Office Action, U.S. Appl. No. 11/461,300, dated Jul. 13, 2012, 33 pages.
United States Notice of Allowance, U.S. Appl. No. 11/461,294, dated Aug. 9, 2012, 33 pages.
United States Final Office Action, U.S. Appl. No. 11/461,279, dated Aug. 10, 2012, 50 pages.
United States Notice of Allowance, U.S. Appl. No. 11/461,286, dated Aug. 14, 2012, 42 pages.
Yanagisawa Kiyoshi, "Access Control Management System using Face Recognition Technology" Nippon Signal Technical Journal, Japan, The Nippon Signal Co., Ltd., Mar. 1, 2002, vol. 26, No. 1, 9 pages (pp. 21-26).
United States Final Office Action, U.S. Appl. No. 12/719,437, Mar. 1, 2012, 518 pages.
United States Notice of Allowance, U.S. Appl. No. 11/461,126, Mar. 5, 2012, 19 pages.
United States Notice of Allowance, U.S. Appl. No. 11/461,143, Mar. 8, 2012, 9 pages.
Japan Patent Office, Office Action for Japanese Patent Application JP2007-199984, Mar. 13, 2012, 3 pages.
United States Notice of Allowance, U.S. Appl. No. 11/776,530, Mar. 26, 2012, 5 pages.
United States Non-Final Office Action, U.S. Appl. No. 12/240,590, Apr. 4, 2012, 73 pages.
United States Notice of Allowance, U.S. Appl. No. 13/168,638, Apr. 4, 2012, 30 pages.
United States Final Office Action, U.S. Appl. No. 12/265,502, Apr. 5, 2012, 49 pages.
United States Final Office Action, U.S. Appl. No. 12/060,198, Apr. 12, 2012, 74 pages.
United States Final Office Action, U.S. Appl. No. 12/060,200, Apr. 12, 2012, 65 pages.
United States Final Office Action, U.S. Appl. No. 11/461,294, Apr. 13, 2012, 23 pages.
United States Final Office Action, U.S. Appl. No. 11/461,286, Apr. 16, 2012, 47 pages.
United States Non-Final Office Action, U.S. Appl. No. 11/461,279, Apr. 19, 2012, 59 pages.
United States Notice of Allowance, U.S. Appl. No. 11/827,530, Apr. 24, 2012, 21 pages.
China Patent Office, Office Action for Chinese Patent Application CN200680039376.7, Apr. 28, 2012, 11 pages.
United States Non-Final Office Action, U.S. Appl. No. 12/121,275, May 18, 2012, 41 pages.
JP Office Action for JP Application No. 2009212242 dated Jul. 16, 2013, 2 pages.
US Non-Final Office Action for U.S. Appl. No. 11/461,085, dated Jul. 9, 2013, 11 pages.
Non-Final Office Action for U.S. Appl. No. 13/330,492, dated Aug. 27, 2013, 14 pages.
Non-Final Office Action for U.S. Appl. No. 11/461,164, dated Aug. 30, 2013, 19 pages.
Non-Final Office Action for U.S. Appl. No. 12/240,596, dated Sep. 5, 2013, 17 pages.
Non-Final Office Action for U.S. Appl. No. 11/461,109, dated Sep. 9, 2013, 14 pages.
Notice of Allowance for U.S. Appl. No. 13/273,189, dated Sep. 13, 2013, 15 pages.
Non-Final Office Action for U.S. Appl. No. 11/461,147, dated Sep. 27, 2013, 15 pages.
Non-Final Office Action for U.S. Appl. No. 12/210,532, dated Oct. 7, 2013, 18 pages.
Non-Final Office Action for U.S. Appl. No. 12/247,205, dated Oct. 7, 2013, 19 pages.
Final Office Action for U.S. Appl. No. 11/461,037, dated Oct. 24, 2013, 24 pages.
Chi-Hung Chi et al., Context Query in Information Retrieval, dated 2002, Proceedings of the 14th IEEE International Conference on Tools with Artificial Intelligence (ICTAI'02) 6 pages (http://ieeexplore.ieee.org/stamp/stamp.jsp?tp=&arnumber=1180793).
European Office Action for Application No. 08 252 377.0, dated Aug. 9, 2013, 5 pages.
European Search Report for Application No. 12159375.0 dated Sep. 12, 2013, 9 pages.
Constantini, R. et al., Virtual Sensor Design, Proceedings of the SPIE, vol. 5301, 2004, pp. 408-419, Retrieved from the Internet <URL:http://ivrgwww.epfl.ch/publications/cs04.pdf>.

(56) References Cited

OTHER PUBLICATIONS

Cover, T.M. et al., Nearest Neighbor Pattern Classification, IEEE Transactions on Information Theory, Jan. 1967, pp. 21-27, vol. IT-13, No. 1.

Davis, M. et al., Towards Context-Aware Face Recognition, Proceedings of the 13th Annual ACM International Conference on Multimedia, Nov. 6-11, 2005, 4 pages.

Di Stefano, L. et al., A Simple and Efficient Connected Components Labeling Algorithm, International Conference on Image Analysis and Processing, 1999, 6 pages.

Doermann, D. et al., Progress in Camera-Based Document Image Analysis, Proceedings of the Seventh International Conference on Document Analysis and Recognition, ICDAR 2003, 11 pages, [online] Retrieved from the Internet <URL:http://www.cse.salford.ac.uk/prima/ICDAR2003/Papers/0111_keynote_III_doermann_d.pdf>.

Duda, R. O. et al., Use of the Hough Transformation to Detect Lines and Curves in Pictures, Communications of the ACM, Jan. 1972, pp. 11-15, vol. 15, No. 1.http://portal.acm.org/citation.cfm?id=361237.361242.

Erol, B. et al., Linking Multimedia Presentations with Their Symbolic Source Documents: Algorithm and Applications, Nov. 2-8, 2003, pp. 498-507, [Online] [Retreived on Oct. 15, 2008] Retrieved from the Internet <URL:http://rii.ricoh.com/{hull/pubs/p225_erol.pdf>.

Erol, B. et al., Linking Presentation Documents Using Image Analysis, IEEE, Nov. 9-12, 2003, pp. 97-101, vol. 1.

Erol, B. et al., Prescient Paper: Multimedia Document Creation with Document Image Matching, 17th International Conference on Pattern Recognition, Aug. 23-26, 2004, Cambridge, UK.

Erol, B. et al., Retrieval of Presentation Recordings with Digital Camera Images, IEEE Conference on Computer Vision and Pattern Recognition, Jun. 27-Jul. 2, 2004.

Esposito, F. et al., Machine Learning Methods for Automatically Processing Historical Documents: from Paper Acquisition to XML Transformation, Proceedings of the First International Workshop on Document Image Analysis for Libraries (DIAL '04), IEEE, 2004, pp. 1-8.

European Partial Search Report, European Application No. EP07015093.3, Dec. 17, 2007, 7 pages.

European Search Report, European Application No. 06796844.6, Oct. 30, 2008, 12 pages.

European Search Report, European Application No. 06796845.3, Oct. 30, 2008, 12 pages.

European Search Report, European Application No. 06796846.1, Nov. 5, 2008, 11 pages.

European Search Report, European Application No. 06796848.7, Oct. 31, 2008, 12 pages.

European Search Report, European Application No. 07252397.0, Oct. 15, 2007, 7 pages.

European Search Report, European Application No. 08159971.4, Nov. 14, 2008, 6 pages.

European Search Report, European Application No. 08160112.2, Nov. 10, 2008, 7 pages.

European Search Report, European Application No. 08160115.5, Nov. 12, 2008, 6 pages.

European Search Report, European Application No. 08160125.4, Oct. 13, 2008, 5 pages.

European Search Report, European Application No. 08160130.4, Nov. 12, 2008, 7 pages.

European Search Report, European Application No. 09156089.6, Jun. 19, 2009, 8 pages.

European Search Report, European Application No. 09170045.0, Nov. 24, 2009, 4 pages.

European Summons for Oral Proceedings, European Application No. 07015093.3, Sep. 16, 2011, 4 pages.

Extended European Search Report, Application No. 09178280.5, Aug. 31, 2010, 6 pages.

Extended European Search Report, European Patent Application No. 082523770, May 2, 2011, 6 pages.

Ezaki, N. et al., Text Detection from Natural Scene Images: Towards a System for Visually Impaired Persons, Proc. of 17th Int. Conf. on Pattern Recognition (ICPR 2004), IEEE Computer Society, Aug. 23-26, 2004, Cambridge, UK, 5 pages.

Fadoua, D. et al., Restoring Ink Bleed-Through Degraded Document Images Using a Recursive Unsupervised Classification Technique, http://www.springerlink.com/content/y83u357034044117/Lecture Notes in Computer Science 3872, Document Analysis Systems VII, 7th International Workshop, DAS 2006, Feb. 13-15, 2006, Nelson, New Zealand, Bunke, H. et al. (eds.), pp. 38-49.

Freund, Y. et al., A Short Introduction to Boosting, Journal of Japanese Society for Artificial Intelligence, Sep. 1999, pp. 771-780, vol. 14, No. 5.

Adobe Acrobat Advanced Elements (for both PC and Mac Computers), 2002, pp. 1-19.

Aggarwal, M et al., On Cosine-fourth and Vignetting Effects in Real Lenses, ICCV Proceedings, IEEE, 2001, vol. 1, pp. 472-479, [online] Retrieved from the internet <URL: http://www.metaverselab.org/classis/635/reading/aggarwal-iccv.pdf>.

Akenini-Moller, T., Real-Time Rendering, A.K. Peters, Natick, MA, 2nd Edition, 2002, pp. 70-84.

A. Antonacopoulos et al., Flexible Page Segmentation Using the Background, Proceedings of the IAPR International Conference on Pattern Recognition, Jerusalem, Oct. 9-12, 1994; pp. 339-344.

Archive of Barcodepedia.com—The Online Barcode Database, [online] [Archived by http://archive.org on Jul. 9, 2006; , 2 pages; Retrieved from the Internet: <http://web.archive.org/web/20060709101455/http://en.barcodepedia.com/>.

Archive of Scanbuy Solutions—Optical Intelligence for your Mobile Devices, Scanbuy® Inc., www.scanbuy.com/website/solutions_summary.htm, [online] [Archived by http://archive.org on Jun. 19, 2006; 1 page; Retrieved on Mar. 3, 2009] Retrieved from the Internet <URL:http://web.archive.org/web/20060619172549/>.

Baba, M. et al., Shadow Removal from a Real Image Based on Shadow Density, Poster at SIGGRAPH2004, updated Aug. 16, 2004, 4 pages, [online] Retrieved from the Internet <URL:http://www.cv.its.hiroshimacu.ac.jp/baba/Shadow/poster04-02.pdf>.

Baird, H. et al., Structured Document Image Analysis;1992; pp. 546-556, Springer-Verlag Berlin Heidelberg.

Baird, H., The State of the Art of Document Image Degradation Modeling; 2000; pp. 1-16, [online] Retrieved from the Internet <URL:http://www2.parc.xerox.com/istl/members/baird/das00.pas.gz>.

Baird, H.S.; Document Image Defect Models and Their Uses, Proc.; IAPR 2nd International Conference on Document Analysis and Recognition; Oct. 20-22, 1993; 7 pages; Tsukuba Science City, Japan.

Barney Smith, E.H. et al.; Text Degradations and OCR Training; International Conference on Document Analysis and Recognition; Aug. 2005; 5 pages; Seoul, Korea; [online] Retrieved from the Internet <URL:http://coen.boisestate.edu/EBarneySmith/Papers/ICDAR05_submit.pdf>.

Bouget, J., Camera Calibration Toolbox for Matlab, Online Source, Updated Jul. 24, 2006, 6 pages, [online] Retrieved from the Internet <URL:http:www.vision.caltech.edu/bougetj/calib_doc/index.html#ref>.

Boukraa, M. et al., Tag-Based Vision: Assisting 3D Scene Analysis with Radio-Frequency Tags, Proceedings of the Fifth International Conference on Information Fusion, Piscataway, N.J., IEEE, Jul. 8-11, 2002, pp. 412-418.

Boyd, S., EE263: Introduction to Linear Dynamical Systems, Online Lecture Notes, Stanford University, Spring Quarter, 2006-2007, Accessed on Jun. 22, 2007, 4 pages, [online] Retrieved from the Internet <URL:http://www.standford/edu/class/ee263/#lectures>.

Brassil et al., Hiding Information in Document Images, Proc. Conf. Information Sciences and Systems (CISS-95), Mar. 1995, 8 pages, Johns Hopkins University, AT&T Bell Laboratories, Murray Hill, NJ.

Call for Papers: ICAT 2007, 17th International Conference on Artificial Reality and Telexistence, Nov. 28-30, 2007, 2 pages, [Online] [Retrieved on Nov. 4, 2008] Retrieved from the Internet <URL:http://www.idemployee.id.tue.nl/g.w.m.rauterberg/conferences/ICAT2007-CfP.pdf>.

(56) References Cited

OTHER PUBLICATIONS

Canny, J., A Computational Approach to Edge Detection, IEEE Transactions on Pattern Analysis and Machine Intelligence, Nov. 1986, pp. 679-714, vol. PAMI-8, No. 6.

Chinese Office Action, Chinese Application No. 200910138044, Jan. 26, 2011, 6 pages.

Hjelmas, E. et al., Face Detection: A Survey, Computer Vision and Image Understanding, dated Oct. 23, 2000, pp. 236-274.

Ho, T.K. et al., Decision Combination in Multiple Classifier Systems, IEEE Transactions on Pattern Analysis and Machine Intelligence, Jan. 1994, pp. 66-75.

Ho, T.K. et al., Evaluation of OCT Accuracy Using Synthetic Data, Proceedings of the 4th Annual Symposium on Document Analysis and Information Retrieval, Apr. 24-26, 1995, pp. 413-422. [online] Retrieved from the Internet <URL:http://citeseer.ist.psu.edu/cache/papers/cs/2303/http:zSzzSzcm.bell-labs.comzSzcmzSzcszSzwhozSzhsbzSzeoasd.pdf/ho95evaluation.pdf>.

Hull, J. J., Document Image Similarity and Equivalence Detection, International Journal on Document Analysis and Recognition, 1998, pp. 37-42, Springer-Verlag.

Hull, J., Document Image Skew Detection: Survey and Annotated Bibliography, Document Analysis Systems II, World Scientific, 1998, pp. 40-64.

Hull, J.J. et al., Document Image Matching Techniques, Apr. 30, 1997, pp. 31-35, [Online] [Retrieved on May 2, 1997] Retrieved from the Internet <URL:http://rii.ricoch.com/hull/pubs/hull_sdiut97.pdf>.

Hull, J.J. et al., Paper-Based Augmented Reality, 17th International Conference on Artificial Reality and Telexistence, Nov. 1, 2007, pp. 205-209.

Hull, J.J. et al., Visualizing Multimedia Content on Paper Documents: Components of Key Frame Selection for Video Paper, Proceedings of the Seventh International Conference on Document Analysis and Recognition (ICDAR'03), IEEE, 2003, 4 pages.

Hull, J.J., Document Image Matching and Retrieval with Multiple Distortion-Invariant Descriptors, International Association for Pattern Recognition Workshop on Document Analysis Systems, Jan. 1, 1995, pp. 375-396.

Hull, J.J., Document Image Matching on CCITT Group 4 Compressed Images, SPIE Conference on Document Recognition IV, Feb. 12, 1997, pp. 82-87.

Jagannathan, L. et al., Perspective Correction Methods for Camera Based Document Analysis, Proc. First Int. Workshop on Camera-based Document Analysis and Recognition, 2005http://www.iiit.net/techreports/2007_107.pdf, pp. 148-154.

Jain, A.K. et al., An Introduction to Biometric Recognition, IEEE Transactions on Circuits and Systems for Video Technology, Jan. 2004, pp. 4-20, vol. 14, No. 1.

Japanese Office Action, Japanese Application No. 2004-293962, Aug. 24, 2010, 3 pages.

Japanese Office Action, Japanese Application No. 2008-008112, Oct. 17, 2011, 3 pages.

Kanungo, T. et al., Global and Local Document Degradation Models, Document Analysis and Recognition, 1993, Proceedings of the Second International Conference on Volume, Oct. 20-22, 1993, pp. 730-734.

Khoubyari, S. et al., Font and Funct on Word Identification in Document Recognition, Computer Vision and Image Understanding, Jan. 1996, pp. 66-74, vol. 63, No. 1.

Khoubyari, S. et al., Keyword Location and Noisy Document Images, Second Annual Symposium on Document Analysis and Information Retrieval, Las Vegas, NV, Apr. 26-28, 1993, pp. 217-231.

Kopec, G.E. et al., Document Image Decoding Using Markov Source Models, IEEE Transactions on Pattern Analysis and Machine Intelligence, Jun. 1994, pp. 602-617, vol. 16, No. 6.

Li, Y. et al., Validation of Image Defect Models for Optical Character Recognition, IEEE Trans. Pattern Anal. Mach. Intell. 18, 2, Feb. 1996, pp. 99-108, [online] Retrieved from the Internet <URL:http://www.cs.cmu.edu/afs/cs/usr/andrewt/papers/Validate/journal.ps.gz>.

Liang, J. et al., Flattening Curved Documents in Images, In Proc. of the IEEE Conf. on Computer Vision and Pattern Recognition (CVPR), 2005, 8 pages, [online] Retrieved from the Internet <URL:http://www.cfar.umd.edu/~daniel/daniel_papersfordownload/liang-j_cpvr2005.pdf>.

Liu, T. et al., A Fast Image Segmentation Algorithm for Interactive Video Hotspot Retrieval, IEEE, 2001, pp. 3-8.

Liu, Y. et al., Automatic Texture Segmentation for Texture-Based Image Retrieval, Proceedings of the 10th International Multimedia Modelling Conference (MMM'04), IEEE, Jan. 5-7, 2004, pp. 285-288.

Lu, Y. et al., Document Retrieval from Compressed Images, Pattern Recognition, 2003, pp. 987-996, vol. 36.

Mae et al., Object Recognition Using Appearance Models Accumulated into Environment, Proc. 15-th Intl. Conf. on Pattern Recognition, 2000, vol. 4, pp. 845-848.

Marques, O. et al., Content-Based Image and Video Retrieval, Video Content Representation, Indexing, and Retrieval, a Survey of Content-Based Image Retrieval Systems, CBVQ (Content-Based Visual Query), Content-Based Image and Video Retrieval [Multimedia Systems and Applications Series], Apr. 1, 2002, pp. 15-117, vol. 21, Kluwer Academic Publishers Group, Boston, USA. (from EP 09156089.6 search report).

McDonald, G., Third Voice: Invisible Web Graffiti, PC World, May 18, 1999, [online] [Retrieved on Nov. 14, 2006] Retrieved from the Internet <URL:http://www.pcworld.com/news/article/0,aid,11016,00.asp>.

Microsoft Computer Dictionary, 5th ed., Hyperlink Definition, 2002, pp. 260-261.

Mobile Search Engines, Sonera MediaLab, Nov. 15, 2002, pp. 1-12.

Mobile Video Managed Service, Vidiator, 2008, [online] [Retrieved on Aug. 29, 2008] Retrieved from the Internet <URL:http://www.vidiator.com/services/managed_mobile_video.aspx>.

Mukherjea, S. et al., AMORE: A World Wide Web Image Retrieval Engine, C&C Research Laboratories, NEC USA Inc., Baltzer Science Publishers BV, World Wide Web 2, 1999, pp. 115-132.

U.S. Office Action, U.S. Appl. No. 12/240,596, Jan. 21, 2011, 21 pages.

U.S. Office Action, U.S. Appl. No. 12/247,205, Oct. 6, 2011, 56 pages.

U.S. Office Action, U.S. Appl. No. 12/253,715, Aug. 31, 2011, 20 pages.

U.S. Office Action, U.S. Appl. No. 12/265,502, Oct. 14, 2011, 61 pages.

U.S. Office Action, U.S. Appl. No. 12/340,124, Oct. 24, 2011, 31 pages.

U.S. Office Action, U.S. Appl. No. 12/719,437, Dec. 9, 2010, 38 pages.

U.S. Office Action, U.S. Appl. No. 12/879,933, Mar. 2, 2011, 7 pages.

U.S. Office Action, U.S. Appl. No. 12/879,933, Oct. 28, 2011, 36 pages.

Veltkamp, R. et al., Content-Based Image Retrieval Systems: A Survey, Department of Computing Science, Utrecht University, Oct. 28, 2002, pp. 1-62.

Wikipedia Online Definition, Optical Character Recognition, Sep. 14, 2008, pp. 1-7, [Online] [Retrieved on Sep. 14, 2008] Retrieved from the Internet <URL:http://en.wikipedia.org/wiki/Optical_character_recognition>.

Wikipedia Online Encyclopedia, Image Scanner, Last Modified Feb. 9, 2010, pp. 1-9, [Online] [Retrieved on Feb. 13, 2010] Retrieved from the Internet <URL:http://en.wikipedia.org/wiki/Image_scanner>.

Wikipedia Online Encyclopedia, Waypoint, Last Modified Feb. 13, 2010, pp. 1-4, [Online] Retrieved on Feb. 13, 2010] Retrieved from the Internet <URL:http://en.wikipedia.org/wiki/Waypoint>.

Wikipedia Online Encyclopedia, Automatic Identification and Data Capture, Jul. 21, 2008, pp. 1-2, [Online] [Retrieved on Sep. 27, 2008] Retrieved from the Internet <URL:http://en.wikipedia.org/wiki/Automatic_identification_and_data_capture>.

Zanibbi, R. et al. A Survey of Table Recognition: Models, Observations, Transformations, and Inferences—International Journal on Document Analysis and Recognition, dated Oct. 24, 2003, pp. 1-33.

(56) References Cited

OTHER PUBLICATIONS

Zhang, Z., A Flexible New Technique for Camera Calibration, IEEE Transactions on Pattern Analysis and Machine Intelligence, Nov. 2000, pp. 1330-1334, vol. 22, No. 11.
Zhao, W. et al., Face Recognition: A Literature Survey, ACM Computing Surveys (CSUR), 2003, pp. 399-458, vol. 35, No. 4.
Zheng, Q.-F. et al., Effective and Efficient Object-Based Image Retrieval Using Visual Phases, Proceedings of the 14th Annual ACM International Conference on Multimedia, MM'06, Oct. 23-27, 2006, Santa Barbara, CA, pp. 77-80.
Zi, G., Groundtruth Generation and Document Image Degradation, University of Maryland Language and Media Processing Laboratory Technical report (LAMP-TR-121), May 2005, 72 pages, [online] Retrieved from the Internet <URL:http://lampsrv01.umiacs.umd.edu/pubs/TechReports/LAMP_121/LAMP_121.pdf>.
Pavlidis, T., Effects of Distortions on the Recognition Rate of a Structural OCR System, In Pro. Conf. on Comp. Vision and Pattern Recog., IEEE, Washington, DC, 1983, pp. 303-309.
PCT International Search Report and Written Opinion, PCT/JP2006/316810, Oct. 10, 2006, 9 pages.
PCT International Search Report and Written Opinion, PCT/JP2006/316811, Oct. 10, 2006, 9 pages.
PCT International Search Report and Written Opinion, PCT/JP2006/316812, Oct. 10, 2006, 9 pages.
PCT International Search Report and Written Opinion, PCT/JP2006/316814, Oct. 10, 2006, 11 pages.
Po, L-M. et al., A Novel Four-Step Search Algorithm for Fast Block Motion Estimation, IEEE Transactions on Circuits and Systems for Video Technology, Jun. 1996, pp. 313-317, vol. 6, Issue 3.
Rademacher, View-Dependent Gemoetry, Computer Graphics Proceedings, Annual Conference Series, SIGGRAPH 99, Los Angeles, California Aug. 8-13, 1999, pp. 439-446.
Rangarajan, K. et al. Optimal Corner Detector, 1988, IEEE, pp. 90-94.http://ieeexplore.ieee.org/xpl/freeabs_all.jsp?arnumber=589975.
Reniers et al., Skeleton-based Hierarchical Shape Segmentation, IEEE International Conference on Shape Modeling an Applications, SMI'07, Jun. 1, 2007, Computer Society, pp. 179-188.
Rosin, P.L. et al., Image Difference Threshold Strategies and Shadow Detection, Proceedings of the 6th British Machine Vision Conference, 1995,10 pages.
Roth, M.T. et al., The Garlic Project, Proc. of the 1996 ACM SIGMOD International Conference on Management of Data, Montreal, Quebec, Canada, Jun. 4, 1996, pp. 557.
Sato, T. et al., High Resolution Video Mosaicing for Documents and Photos by Estimating Camera Motion, Proceedings of the SPIE 5299, 246, 2004, 8 pages, [online] Retrieved from the Internet <URL:http://yokoya.naist.jp/paper/datas/711/spie2004.pdf>.
Schalkoff, R.J., Syntactic Pattern Recognition (SYNTPR) Overview, Pattern Recognition: Statistical, Structural and Neural Approaces, Jan. 1, 1992, pp. 127-150, vol. 3, Wiley.
Sezgin, M. et al., Survey Over Image Thresholding Techniques and Quantitative Performance Evaluation, http://citeseer.comp.nus.edu.sg/675166.htmlJournal of Electronic Imaging, Jan. 2004, pp. 146-165, vol. 13, No. 1.
Sivic, J. et al., Video Google: A Text Retrieval Approach to Object Matching in Videos, Proceedings of the Ninth IEEE International Conference on Computer Vision (ICCV 2003), 2-Volume Set, 2003, IEEE, pp. 1-8.
Stoyanov, D., Camera Calibration Tools, Online Source, Updated Aug. 24, 2006, Accessed Aug. 31, 2006, 12 pages, [online] Retrieved from the Internet <URL:http://ubimon.doc.ic.ac.uk/dvs/index.php?m=581>.
Triantafyllidis, G.A. et al., Detection of Blocking Artifacts of Compressed Still Images, Proceedings of the 11th International Conference on Image Analysis and Processing (ICIAP '01), IEEE, 2001, pp. 1-5.
U.S. Office Action, U.S. Appl. No. 12/059,583, dated Sep. 10, 2012, 41 pages.
U.S. Notice of Allowance, U.S. Appl. No. 12/240,590, dated Oct. 1, 2012, 19 pages.
U.S. Notice of Allowance, U.S. Appl. No. 12/491,018, dated Oct. 11, 2012, 13 pages.
U.S. Office Action, U.S. Appl. No. 13/415,756, dated Oct. 26, 2012, 40 pages.
U.S. Office Action, U.S. Appl. No. 12/253,715, dated Nov. 14, 2012, 76 pages.
U.S. Office Action, U.S. Appl. No. 11/461,300, dated Nov. 28, 2012, 37 pages.
U.S. Notice of Allowance, U.S. Appl. No. 12/121,275, dated Nov. 28, 2012, 31 pages.
U.S. Office Action, U.S. Appl. No. 13/415,228, dated Dec. 3, 2012, 38 pages.
JP Office Action, JP Application No. 2008-180789, dated Sep. 25, 2012, 3 pages.
Tomohiro Nakai; Document Image Retrieval Based on Cross-Ration and Hashing IEICE Technical Report; The Institute of Electronics, Information and Communication Engineers; dated Mar. 11, 2005; vol. 104 No. 742; pp. 103-108.
U.S. Office Action, U.S. Appl. No. 13/273,189, dated Nov. 28, 2012, 26 pages.
U.S. Office Action, U.S. Appl. No. 13/273,186, dated Dec. 17, 2012, 28 pages.
U.S. Office Action, U.S. Appl. No. 11/461,279, dated Dec. 19, 2012, 31 pages.
U.S. Notice of Allowability, U.S. Appl. No. 12/240,590, dated Dec. 20, 2012, 4 pages.
U.S. Office Action, U.S. Appl. No. 11/461,037, dated Jan. 7, 2013, 21 pages.
U.S. Appeal Decision, U.S. Appl. No. 11/461,085, dated Jan. 23, 2013, 8 pages.
U.S. Office Action, U.S. Appl. No. 12/340,124, dated Jan. 23, 2013, 23 pages.
U.S. Notice of Allowance, U.S. Appl. No. 13/415,756, dated Feb. 4, 2013, 7 pages.
U.S. Office Action, U.S. Appl. No. 12/060,206, dated Feb. 8, 2013, 16 pages.
U.S. Office Action, U.S. Appl. No. 11/461,037, Mar. 30, 2011, 29 pages.
U.S. Office Action, U.S. Appl. No. 11/461,037, Mar. 4, 2010, 16 pages.
U.S. Office Action, U.S. Appl. No. 11/461,037, Nov. 23, 2011, 33 pages.
U.S. Supplemental Final Office Action, U.S. Appl. No. 11/461,109, Oct. 23, 2009, 22 pages.
U.S. Office Action, U.S. Appl. No. 11/461,279, Aug. 5, 2010, 37 pages.
U.S. Office Action, U.S. Appl. No. 11/461,279, Feb. 19, 2010, 33 pages.
U.S. Office Action, U.S. Appl. No. 11/461,279, Jan. 7, 2011, 44 pages.
U.S. Office Action, U.S. Appl. No. 11/461,279, Jul. 8, 2011, 46 pages.
U.S. Office Action, U.S. Appl. No. 11/461,279, Sep. 17, 2009, 25 pages.
U.S. Office Action, U.S. Appl. No. 11/461,286, Aug. 5, 2010, 28 pages.
U.S. Office Action, U.S. Appl. No. 11/461,286, Feb. 19, 2010, 23 pages.
U.S. Office Action, U.S. Appl. No. 11/461,286, Jan. 20, 2012, 27 pages.
U.S. Office Action, U.S. Appl. No. 11/461,286, Jan. 21, 2011, 34 pages.
U.S. Office Action, U.S. Appl. No. 11/461,286, Jul. 15, 2011, 37 pages.
U.S. Office Action, U.S. Appl. No. 11/461,286, Sep. 17, 2009, 22 pages.
U.S. Office Action, U.S. Appl. No. 11/461,300, Feb. 23, 2012, 38 pages.
U.S. Office Action, U.S. Appl. No. 11/461,300, Jun. 11, 2010, 20 pages.
U.S. Office Action, U.S. Appl. No. 11/461,300, Oct. 6, 2010, 20 pages.

(56) References Cited

OTHER PUBLICATIONS

U.S. Office Action, U.S. Appl. No. 12/060,206, Dec. 15, 2011, 55 pages.
U.S. Office Action, U.S. Appl. No. 12/059,583, Jan. 26, 2012, 78 pages.
U.S. Office Action, U.S. Appl. No. 12/060,198, Sep. 1, 2011, 87 pages.
U.S. Office Action, U.S. Appl. No. 12/060,200, Sep. 2, 2011, 65 pages.
U.S. Office Action, U.S. Appl. No. 12/121,275, Apr. 20, 2011, 44 pages.
U.S. Office Action, U.S. Appl. No. 12/121,275, Oct. 19, 2011, 24 pages.
U.S. Office Action, U.S. Appl. No. 12/210,511, Apr. 4, 2011, 49 pages.
U.S. Office Action, U.S. Appl. No. 12/210,511, Sep. 28, 2011, 25 pages.
U.S. Office Action, U.S. Appl. No. 12/210,519, Jan. 5, 2012, 29 pages.
U.S. Office Action, U.S. Appl. No. 12/210,519, Jun. 16, 2011, 22 pages.
U.S. Office Action, U.S. Appl. No. 12/210,519, Mar. 14, 2011, 38 pages.
U.S. Office Action, U.S. Appl. No. 12/210,532, Oct. 31, 2011, 61 pages.
U.S. Office Action, U.S. Appl. No. 12/210,540, Oct. 14, 2011, 22 pages.
U.S. Office Action, U.S. Appl. No. 12/240,596, Aug. 6, 2010, 32 pages.
U.S. Office Action, U.S. Appl. No. 12/240,596, Feb. 2, 2012, 44 pages.
US Notice of Allowance for U.S. Appl. No. 11/461,300 dated May 15, 2013, 13 pages.
US Final Office Action for U.S. Appl. No. 13/273,186, dated Jun. 12, 2013, 24 pages.
US Non-Final Office Action for U.S. Appl. No. 11/461,037, dated Jun. 24, 2013, 25 pages.
US Non-Final Office Action for U.S. Appl. No. 12/719,437, dated Jun. 25, 2013, 22 pages.
US Notice of Allowance for U.S. Appl. No. 11/461,279, dated Jul. 31, 2013, 14 pages.
JP Office Action for JP Patent Application No. 2009-119205 dated Feb. 19, 2013, 2 pages.
U.S. Appeal Decision, U.S. Appl. No. 11/461,164, dated Feb. 27, 2013, 10 pages.
U.S. Appeal Decision, U.S. Appl. No. 11/461,147, dated Mar. 4, 2013, 11 pages.
U.S. Appeal Decision, U.S. Appl. No. 11/461,109, dated Mar. 13, 2013, 23 pages.
US Non-Final Office Action for U.S. Appl. No. 12/060,200, dated Mar. 22, 2013, 47 pages.
US Final Office Action for U.S. Appl. No. 11/461,279 dated Mar. 25, 2013, 36 pages.
US Non-Final Office Action for U.S. Appl. No. 12/060,198 dated Apr. 2, 2013, 56 pages.
US Notice of Allowance for U.S. Appl. No. 13/415,228 dated Apr. 30, 2013, 10 pages.
US Notice of Allowance for U.S. Appl. No. 12/210,519 dated May 1, 2013, 24 pages.
US Notice of Allowance for U.S. Appl. No. 13/273,189 dated May 9, 2013, 11 pages.
Non-Final Office Action for U.S. Appl. No. 12/060,198, dated Nov. 7, 2013, 55 pages.
Final Office Action for U.S. Appl. No. 12/060,200, dated Nov. 8, 2013, 58 pages.
Non-Final Office Action for U.S. Appl. No. 13/273,186, dated Dec. 5, 2013, 25 pages.
Final Office Action for U.S. Appl. No. 11/461,085, dated Dec. 10, 2013, 16 pages.
Non-Final Office Action for U.S. Appl. No. 13/729,458, dated Dec. 17, 2013, 8 pages.
Non-Final Office Action for U.S. Appl. No. 12/253,715, dated Dec. 19, 2013, 38 pages.
Notice of Allowance for U.S. Appl. No. 12/240,596, dated Dec. 23, 2013, 10 pages.
Final Office Action for U.S. Appl. No. 11/461,164, dated Dec. 26, 2013, 17 pages.
Final Office Action for U.S. Appl. No. 13/330,492, dated Jan. 2, 2014, 15 pages.
Final Office Action for U.S. Appl. No. 12/719,437, dated Jan. 16, 2014, 22 pages.
Non-Final Office Action for U.S. Appl. No. 13/789,669, dated Jan. 17, 2014, 6 pages.
Non-Final Office Action for U.S. Appl. No. 12/340,124, dated Jan. 29, 2014, 24 pages.
Non-Final Office Action for U.S. Appl. No. 13/933,078, dated Mar. 17, 2014, 9 pages.
Notice of Allowance for U.S. Appl. No. 13/273,186, dated Mar. 26, 2014, 9 pages.
Notice of Allowance for U.S. Appl. No. 11/461,037, dated Apr. 3, 2014, 10 pages.
Non-Final Office Action for U.S. Appl. No. 12/060,200, dated Apr. 8, 2014, 65 pages.
Non-Final Office Action for U.S. Appl. No. 11/461,085, dated Apr. 9, 2014, 16 pages.
Final Office Action for U.S. Appl. No. 11/461,147, dated Apr. 24, 2014, 11 pages.
Notice of Allowance for U.S. Appl. No. 12/210,511, dated Apr. 30, 2014, 11 pages.
Final Office Action for U.S. Appl. No. 12/247,205, dated May 13, 2014, 17 pages.
Notice of Allowance for U.S. Appl. No. 12/210,540, dated May 22, 2014, 20 pages.
Final Office Action for U.S. Appl. No. 13/729,458, dated Jun. 2, 2014, 8 pages.
Final Office Action for U.S. Appl. No. 12/060,198, dated Jun. 5, 2014, 63 pages.
Josef Sivic, "Video Google: A Text Retrieval Approach to Object Matching in Videos," IEEE, Proceedings of the Ninth IEEE International Conference on Computer Vision (ICCV 2003), 8 pages, vol. 2.
Japanese Office Action for JP Application No. 2013222652, dated May 20, 2014, 5 pages.
Japanese Office Action for JP Application No. 2013222655, dated May 20, 2014, 4 pages.
Notice of Allowance for U.S. Appl. No. 13/729,458, dated Sep. 29, 2014, 8 pages.
Final Office Action for U.S. Appl. No. 13/933,078, dated Oct. 6, 2014, 14 pages.
Notice of Allowance for U.S. Appl. No. 12/060,200, dated Nov. 5, 2014, 8 pages.
Non-Final Office Action for U.S. Appl. No. 13/789,669, dated Nov. 19, 2014, 13 pages.
Final Office Action for U.S. Appl. No. 13/330,492, dated Nov. 26, 2014, 18 pages.
Notice of Allowance for U.S. Appl. No. 12/340,124, dated Dec. 19, 2014, 12 pages.
Non-Final Office Action for U.S. Appl. No. 11/461,109 dated Jun. 26, 2014, 18 pages.
Notice of Allowance for U.S. Appl. No. 13/273,186 dated Jul. 10, 2014, 9 pages.
Non-Final Office Action for U.S. Appl. No. 13/330,492 dated Jul. 17, 2014, 16 pages.
Final Office Action for U.S. Appl. No. 12/253,715, dated Jul. 25, 2014, 40 pages.
Final Office Action for U.S. Appl. No. 12/340,124, dated Aug. 21, 2014, 26 pages.
Final Office Action for U.S. Appl. No. 13/789,669 dated Aug. 29, 2014, 9 pages.
Non-Final Office Action for U.S. Appl. No. 13/494,008 dated Sep. 10, 2014, 18 pages.
Non-Final Office Action for U.S. Appl. No. 11/461,164, dated Sep. 15, 2014, 18 pages.

(56) References Cited

OTHER PUBLICATIONS

Notice of Allowance for U.S. Appl. No. 11/461,085, dated Sep. 17, 2014, 5 pages.
Moghaddam et al., Visualization and User-Modeling for Browsing Personal Photo Libraries, Mitsubishi Electric Research Laboratories, dated Feb. 2004, 34 pages.
Japanese Application Office Action for JP Publication No. 2013-192033, dated Jun. 24, 2014, 7 pages.
Japanese Application Office Action for JP Publication No. 2013-222655, dated Aug. 26, 2014, 5 pages.
Jonathan Hull, Mixed Media Reality (MMR) A New Method of eP-Fusion, Ricoh Technical Report, Ricoh Company, Ltd., dated Dec. 1, 2007, No. 33, p. 119-125; online search dated Aug. 22, 2013 <URL: http://www.ricoh.com/ja/technology/techreport/33/pdf/A3314.pdf>.
Non-Final Office Action for U.S. Appl. No. 12/253,715, dated Jan. 7, 2015, 35 pages.
Final Office Action for U.S. Appl. No. 11/461,109, dated Jan. 15, 2015, 20 pages.
Final Office Action for U.S. Appl. No. 13/494,008, dated Feb. 10, 2015, 20 pages.
Non-Final Office Action for U.S. Appl. No. 13/933,078, dated Feb. 26, 2015, 7 pages.
Final Office Action for U.S. Appl. No. 11/461,164, dated Mar. 12, 2015, 19 pages.
Non-Final Office Action for U.S. Appl. No. 12/060,198, dated Mar. 13, 2015, 22 pages.
Notice of Allowance for U.S. Appl. No. 13/789,669, dated Mar. 16, 2015, 8 pages.
Non-Final Office Action for U.S. Appl. No. 11/461,147, dated Mar. 20, 2015, 11 pages.

* cited by examiner

GENERATING A CONVERSATION IN A SOCIAL NETWORK BASED ON VISUAL SEARCH RESULTS

BACKGROUND OF THE INVENTION

1. Field of the Invention

The specification relates to a system and method for generating a conversation in a social network based on visual search results. In particular, the specification relates to indexing MMR objects, receiving an image from a user, matching the image to an MMR object and generating a conversation based on the MMR object.

2. Description of the Background Art

There currently exists a gap between different types of media. People still use print media for things such as textbooks and class notes. However, much of the discussion of educational materials takes place electronically over email, texting, posting or on electronic blackboard systems.

One attempt by the prior art to solve this problem is to associate paper media with an electronic version. If the user wants to collaborate with other users regarding an activity related to the paper media, the user can email the electronic document to other students or post something on a social network. This method, however, is cumbersome and can be both over-inclusive because most of the user's friends will find the post irrelevant and under-inclusive because the user is not friends with all the students for a particular class.

SUMMARY OF THE INVENTION

The present invention overcomes the deficiencies of the prior art with a system for generating a conversation in a social network that corresponds to a mixed media reality (MMR) object based on visual search results. A conversation includes multiple discussion threads about the same source material.

The user devices include an access module for capturing images, transmitting the images to an MMR server and receiving a user interface from a social network server. An MMR server includes an MMR database for storing MMR objects and an MMR engine for receiving images from user devices and retrieving MMR objects that correspond to the received image. The MMR object corresponds to source material, such as a textbook. The content management server includes a content management engine for generating metadata that is indexed in the metadata database. In one embodiment, the content management engine generates metadata based on information received from a social network server, such as comments relating to a conversation that corresponds to an MMR object. In another embodiment, the content management engine generates clusters that include MMR objects with similar source material, which is determined based on the metadata.

The social network server includes a social network application and storage. Once the MMR engine identifies the MMR object that corresponds to an image, the MMR engine transmits the MMR object to the social network application. The social network application includes a conversation engine that determines whether a conversation corresponding to the MMR object already exists. If yes, then the conversation engine provides the user with access to the conversation. If not, the conversation engine generates a conversation. A user interface engine generates a user interface that includes an option for the user to join the conversation. In one embodiment, a statistics manager generates statistics about the conversation that is displayed as part of the user interface.

In another embodiment, the conversation engine generates a discussion group based on the cluster or proximity information. The conversation engine receives the MMR object and proximity information about at least one of a time and a location that the image was captured. The conversation engine determines whether a discussion group relating to the cluster or proximity information already exists. If not, the conversation engine generates a discussion group. If the discussion group does exist, the conversation engine grants the user access to the discussion group.

BRIEF DESCRIPTION OF THE DRAWINGS

The invention is illustrated by way of example, and not by way of limitation in the figures of the accompanying drawings in which like reference numerals are used to refer to similar elements.

FIGS. 6A-6F are graphic representations of embodiments of user interfaces that display the conversation or a discussion group.

DETAILED DESCRIPTION OF THE PREFERRED EMBODIMENTS

Figure 1:
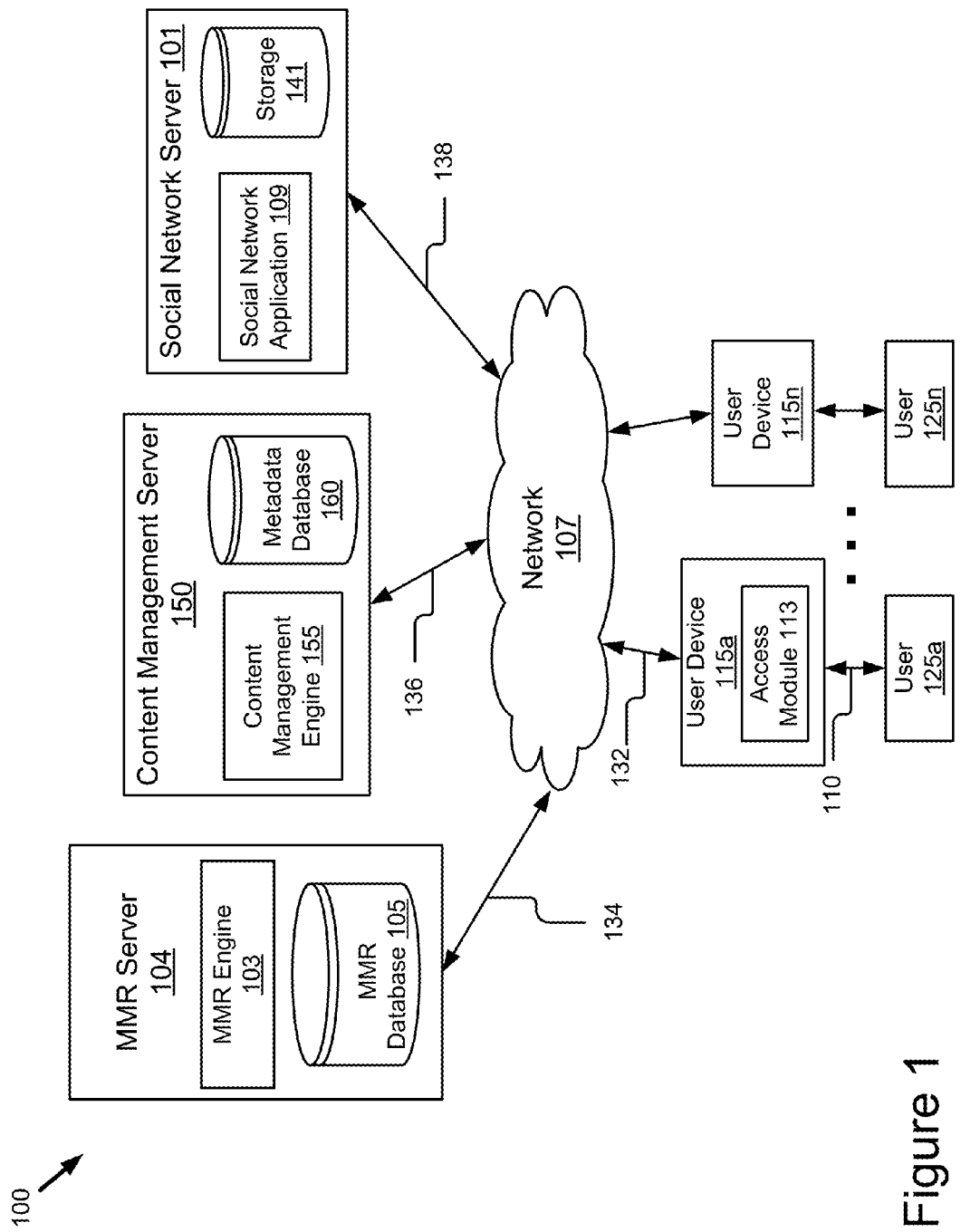
FIG. 1 is a high-level block diagram illustrating one embodiment of a system for generating a conversation based on visual search results.

A system and method for generating a conversation in a social network based on visual search results are described below. In the following description, for purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for generating a conversation in a social network based on visual search results according to one embodiment of the invention. The system 100 includes a plurality of user devices 115a-115n that are accessed by users 125a-125n, a mixed media reality (MMR) server 104, a content management server 150 and a social network server 101 that are communicatively coupled to the network 107. Persons of ordinary skill in the art will recognize that the engines and storage in one server could also be combined with another server. In FIG. 1 and the remaining figures, a letter after a reference number, such as "115a" is a reference to the element having that particular reference number. A reference number in the text without a following letter, such as "115," is a general reference to any or all instances of the element bearing that reference number.

The network 107 is a conventional type, wired or wireless, and may have any number of configurations such as a star configuration, token ring configuration or other configurations known to those skilled in the art. Furthermore, the network 107 may comprise a local area network (LAN), a wide area network (WAN) (e.g., the Internet), and/or any other interconnected data path across which multiple devices may communicate. In yet another embodiment, the network 107 may be a peer-to-peer network. The network 107 may also be coupled to or includes portions of a telecommunications network for sending data in a variety of different communication protocols. In yet another embodiment, the network 107 includes Bluetooth communication networks or a cellular communications network for sending and receiving data such as via short messaging service (SMS), multimedia messaging service (MMS), hypertext transfer protocol (HTTP), direct data connection, WAP, email, etc. While only one network 107 is coupled to the user devices 115a, 115n, the MMR server 104, the content management server 150 and the social network server 101, in practice any number of networks 107 can be connected to the entities.

The user device 115a is any computing device that includes an access module 113, a memory and a processor, such as a personal computer, a laptop, a smartphone, a cellular phone, a personal digital assistant (PDA), etc. The user device 115a is adapted to send and receive information such as images, time, location, etc. The user device 115a is connected to the network 107 via signal line 132. The user 125a interacts with the user device 115a via signal line 110. Although only two user devices 115a, 115n are illustrated, persons of ordinary skill in the art will recognize that any number of user devices 115n are available to any number of users 125n.

The access module 113, which includes software for capturing an image and transmitting the image to the MMR server 104 for performing a visual search. Once the MMR server 104 transmits the MMR object to the social network server 101 and the social network server 101 generates a user interface, the user interface is transmitted to the access module 113 for display on the user device 115a. In one embodiment, the access module 113 is a self-contained application for performing the capturing and displaying. In another embodiment, the access module 113 works in conjunction with a browser to capture the image and display the user interface.

The MMR server 104 includes an MMR engine 103 and an MMR database 105. The MMR engine 103 includes software for performing a visual search with information (for e.g., an image) received from the user device 115 to identify an MMR object from the MMR database 105. MMR objects are electronic versions of source material, such as a book, an educational supplement, a poster, a class, a professor, an educational institution and a study group. The MMR server 104 is coupled to the network 107 via signal line 134. Although only one MMR server 104 is shown, persons of ordinary skill in the art will recognize that multiple MMR servers 104 may be present.

The social network server 101 includes a social network application 109 and storage 141. A social network is any type of social structure where the users are connected by a common feature. The common feature includes, work, school, friendship, family, an interest, etc. The social network application 109 receives information from the MMR server 104 and the content management server 150, generates a discussion thread, identifies conversations related to the received information, generates user interfaces and transmits the user interfaces to the user devices 115 for display. The storage 141 stores data associated with the social network such as user information, relationships between users as a social graph, discussion threads, conversations between users, etc. The social network server 101 is coupled to the network 107 via signal line 138. Although only one social network server 101 is shown, persons of ordinary skill in the art will recognize that multiple social network servers 101 may be present.

The content management server 150 includes a content management engine 155 and a metadata database 160. The content management server 150 is coupled with the network 107 via signal line 136. Although only one content management server 150 is shown, persons of ordinary skill in the art will recognize that multiple content management servers 150 may be present.

The metadata database 160 stores and indexes metadata associated with the MMR objects stored in the MMR database 105. The metadata is any data that provides information about one or more aspects of an MMR object. For example, the metadata of an MMR object that represents a mathematics book: "Probability and Statistics for Engineers" are tags such as "probability," "bayesian," "belief networks," "statistics," author, title, publisher, links to additional material associated with the book, number of pages in the book, price, book stores from where the book can be purchased, comments and discussions about the book (such as a discussion thread on a social network, a book review website, etc.), users who posted the comments and discussions, etc. In one embodiment, the metadata database 160 is automatically populates in an offline process. In another embodiment, the metadata database 160 is updated after receiving metadata from the social network server 101 about user interactions with the MMR object (such as comments, links, PDFs, chats, user connections, etc.).

In one embodiment, the content management engine 155 includes software for generating a cluster group of MMR objects based on the relatedness of the MMR objects, i.e. MMR objects with similar source material such as a text book, a poster and class notes that relate to the same class. In one embodiment, the content management engine 155 is a set of instructions executable by a processor to provide the functionality described below for generating clusters of MMR objects. In another embodiment, the content management engine 155 is stored in a memory and is accessible and executable by the processor.

The content management engine 155 generates clusters of MMR objects by applying a similarity vector and based on the relatedness of the metadata and the users that are associated with the MMR object (including whether they are actively using the MMR objects). In one embodiment, the similarity vector is based on k-means, agglomerative clustering, fuzzy clustering or formal concept analysis. In one embodiment, the content management engine 155 generates the clusters as part of the process of indexing metadata for the metadata database 160. In another embodiment, the content management engine 155 generates clusters responsive to receiving an image from a user device 115.

For example, the content management engine 155 determines that the following items are related source materials: a textbook on "*Probability and Statistics for Engineers*"; a handout provided by a professor with specific problems on Bayesian nets; and a similar book "*Fifty Challenging Problems in Probability with Solutions*." As a result, three different users could become part of a group based on each one capturing an image of one of those items.

The content management engine 155 also includes software for updating the metadata database 160. In one embodiment, the content management engine 155 receives and indexes content from the social network server 101 to determine whether they are related to an MMR object. Content from the social network server 101 includes, for example, a status of the MMR objects so that the MMR engine 103 generates active clusters and discussion content such as comments, links, PDFs, chats and user connections. The content management engine 155 then indexes the content along with other metadata.

In another embodiment, the content management engine 155 dynamically updates the metadata by retrieving information relevant to an MMR object from a third-party server (not shown). For example, the content management engine 155 uses existing tags of an MMR object from the metadata database 160 to query a search server and retrieve additional information relevant to the MMR object. In another example, the content management engine 155 receives metadata from a user via the social network server 101, such as keywords associated with an MMR object that are submitted by a user. The content management engine 155 then updates the metadata database 160 with the additional information. The content management engine 155 updates the metadata database 160 periodically, for example, automatically every day, every hour or responsive to receiving a request for metadata from the MMR engine 103.

MMR Object 200

Figure 2A:
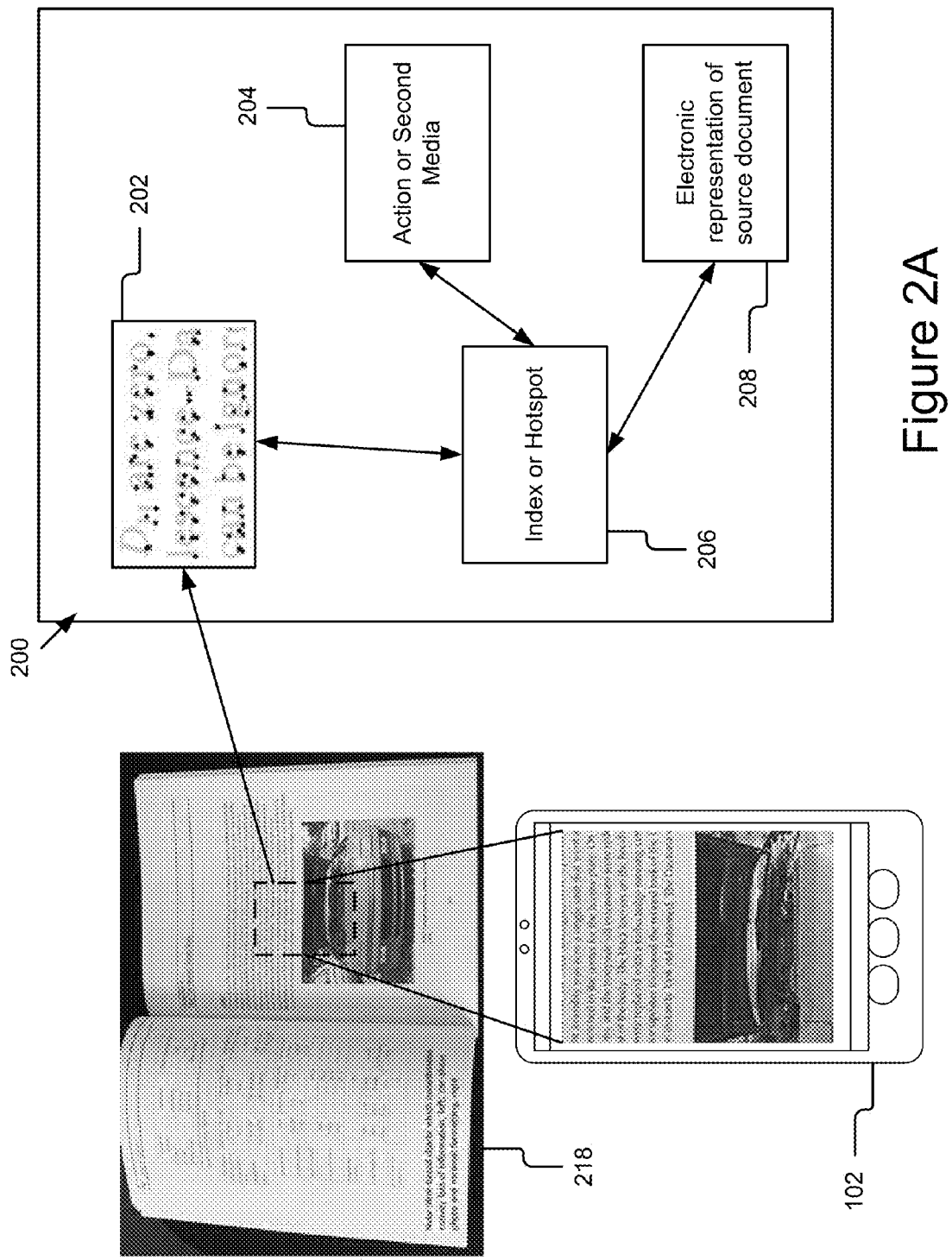
FIG. 2A-2B are block diagrams illustrating different embodiments of an MMR object.

FIG. 2A illustrates an example of an MMR object 200 according to one embodiment. The MMR object 200 includes a representation 202 of a portion of a source material 218, an action or second media 204, an index or hotspot 206 and an electronic representation 208 of the source material 218. All this information is indexed with the MMR object 200 and stored by the MMR database 105, which is described in greater detail below with reference to FIG. 3. In this illustrated example, the source material 218 is a book. A person with ordinary skill in the art would recognize that the source material 218 is any document, such as one or more pages of a book, a magazine, news articles, pages printed from a website, hand-written notes, notes on a white-board, a memo having any number of pages (for example, work related, personal letter, etc.), a product label, a product specification, a product/service brochure or advertising materials (for example, an automobile, a cleaning service, etc.), a poster or pages printed from any processing system (for example, a desktop, a laptop, a smart phone, etc.).

The representation 202 of a portion of the source material 218 is an image, vectors, pixels, text, codes or any other format known to a person with ordinary skill in the art that is usable for pattern matching. The representation 202 also identifies at least one location within the source material 218. In one embodiment, the representation 202 is a text fingerprint as shown in FIG. 2. The text fingerprint 202, for example, is captured automatically during printing or scanning the source material 218. A person with ordinary skill in the art would recognize that the representation 202 represents a patch of text, a single word if it is a unique instance in the source material 218, a portion of an image, a unique attribute, the entire source material 218, or any other matchable portion of the document.

The action or second media 204 is a digital file or a data structure of any type. In one embodiment, the action or second media 204 is one more commands to be executed or text to be presented. In another embodiment, the action or second media type 204 is a text file, an image file, an audio file, a video file, an application file (for example, a spreadsheet or word processing document), a PDF file, metadata, etc., associated with the representation 202. In yet another embodiment, the action or second media type 204 is a data structure or file referencing or including multiple different media types and multiple files of the same media type.

The MMR object 200 also includes an electronic representation 208 of the source material 218. In one embodiment, the electronic representation 208 is used for displaying on the user device 115. In another embodiment, the electronic representation 208 is used to determine the position of the hotspot 206 within the document. In this illustrated example, the electronic representation 208 is an electronic version of the entire book, a page within the book, the cover page of the book, an image of the source material such as an thumbnail image, etc.

The index or hotspot 206 is a link between the representation 202, the action or second media 204 and the electronic representation 208. The hotspot 206 associates the representation 202 and the second media 204. In one embodiment, the index or hotspot 206 includes position information such as the x-y coordinates within the source material 218. The hotspot 206 is a point, an area or even the entire source material 218. In one embodiment, the hotspot 206 is a data structure with a pointer to the representation 202, a pointer to the second media 204 and a location within the source material 218. In one embodiment, the MMR object 200 has multiple hotspots, and in this embodiment, the data structure creates links between multiple representations, multiple second media files and multiple locations within the source material 218.

An example use of the MMR object 200 as illustrated in FIG. 2A is as follows. A user points a mobile device 102 such as a smart phone at a source material 218 and captures an image. Subsequently, the MMR engine 103 performs a visual search by analyzing the captured image and performing pattern matching to determine whether an associated MMR object 200 exists in the MMR database 105. If a match is found, the electronic representation 208 of the MMR object 200 is retrieved and displayed on the mobile device 102.

Figure 2B:
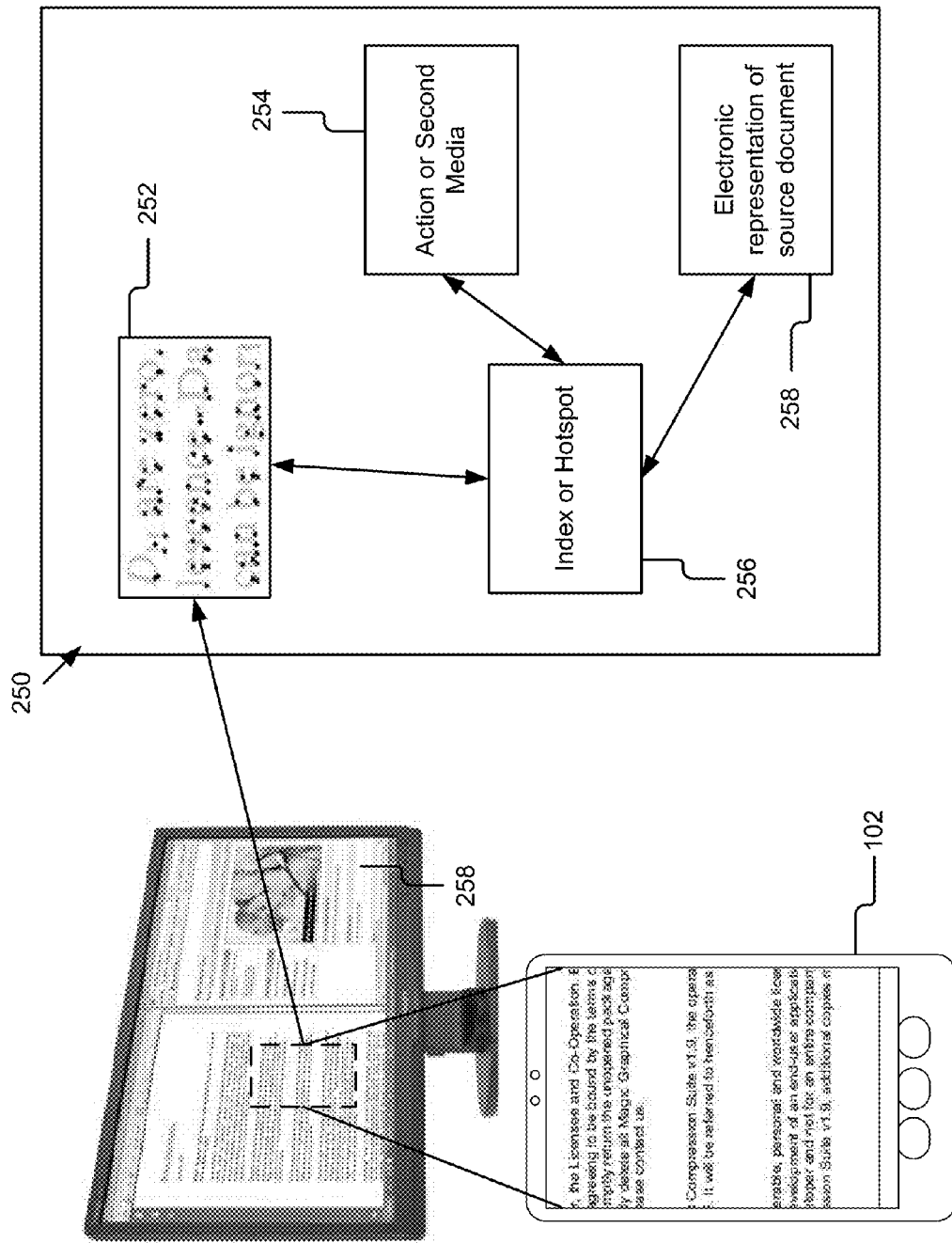

FIG. 2B illustrates another example use of an MMR object 250. A user points the mobile device 102 at a computer monitor displaying a source material 258 and captures an image. The MMR engine 103 performs a visual search using the captured image to identify a corresponding MMR object 250 from the MMR database 105. Similar to the example mentioned above, the MMR object 250 includes a representation 252 of a portion of the source material 258, an action or second media 254, an index or hotspot 256 and an electronic representation 258 of the source material 258. The MMR engine 103 performs the action 254 and displays the electronic representation 258 on the mobile device 102.

MMR Engine 103

Figure 3:
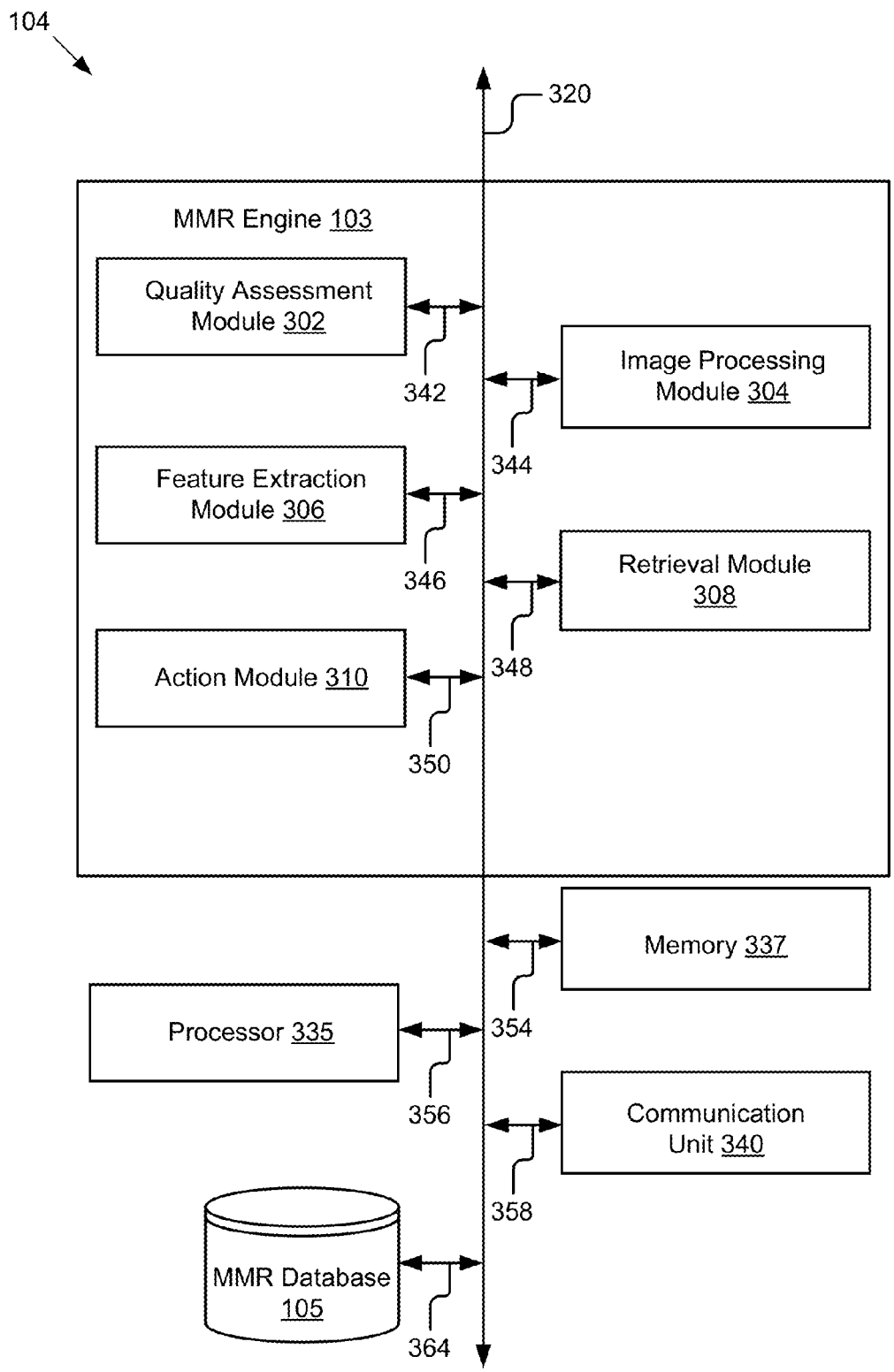
FIG. 3 is a block diagram illustrating one embodiment of a MMR engine in more detail.

FIG. 3 is a block diagram of the MMR server 104 that includes the MMR engine 103, a memory 337, a processor 335, a communication unit 340 and the MMR database 105.

The processor 335 comprises an arithmetic logic unit, a microprocessor, a general purpose controller or some other processor array to perform computations and provide electronic display signals to a display device. The processor 335 is coupled to the bus 320 for communication with the other components via signal line 356. Processor 335 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 337 stores instructions and/or data that may be executed by processor 335. The memory 337 is coupled to the bus 320 for communication with the other components via signal line 354. The instructions and/or data may comprise code for performing any and/or all of the techniques described herein. The memory 337 may be a dynamic random access memory (DRAM) device, a static random access memory (SRAM) device, flash memory or some other memory device known in the art. In one embodiment, the memory 337 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 340 receives data such as images from the user device 115 and transmits requests to the social network server 101, for example a request for discussions related to an MMR object identified by the MMR engine 103 corresponding to a received image. The communication unit 340 also receives information from the social network server 101. The communication unit 340 also transmits feedback to the user device 115, for example, feedback that the received image is not of good quality. The communication unit 340 is coupled to the bus 320 via signal line 358. In one embodiment, the communication unit 340 includes a port for direct physical connection to the user device 115, the social network server 101 or to another communication channel. For example, the communication unit 340 includes a USB, SD, CAT-5 or similar port for wired communication with the user device 115. In another embodiment, the communication unit 340 includes a wireless transceiver for exchanging data with the user device 115, the social network server 101 or any other communication channel using one or more wireless communication methods, such as IEEE 802.11, IEEE 802.16, BLUETOOTH® or another suitable wireless communication method.

In yet another embodiment, the communication unit 340 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 340 includes a wired port and a wireless transceiver. The communication unit 340 also provides other conventional connections to the network for distribution of files and/or media objects using standard network protocols such as TCP/IP, HTTP, HTTPS and SMTP as will be understood by those skilled in the art.

The MMR database 105 includes the MMR objects. In one embodiment, the MMR objects are indexed by the MMR database 105 according to the source material, the electronic representation of the source document and an action or second media, such as a link. The MMR database 105 indexes the MMR objects using, for example, a unique object ID, a page ID, an x-y location of a patch of text, a hotspot or an image within a document, the width and height of a rectangular region within a document, features such as two-dimensional arrangements of text and images within the document, actions, clusters generated by the MMR engine 103, etc. In one embodiment, the MMR database 105 also stores relevant information about each MMR object, for example, font styles and sizes of a document, print resolution etc. The MMR database 105 is described in further detail in U.S. patent application Ser. No. 11/461,017, titled "System And Methods For Creation And Use Of A Mixed Media Environment," filed Jul. 31, 2006; U.S. patent application Ser. No. 11/461,279, titled "Method And System For Image Matching In A Mixed Media Environment," filed Jul. 31, 2006; U.S. patent application Ser. No. 11/461,286, titled "Method And System For Document Fingerprinting Matching In A Mixed Media Environment," filed Jul. 31, 2006; U.S. patent application Ser. No. 11/461,294, titled "Method And System For Position-Based Image Matching In A Mixed Media Environment," filed Jul. 31, 2006; U.S. patent application Ser. No. 11/461,300, titled "Method And System For Multi-Tier Image Matching In A Mixed Media Environment," filed Jul. 31, 2006; U.S. patent application Ser. No. 11/461,147, titled "Data Organization and Access for Mixed Media Document System," filed Jul. 31, 2006; U.S. patent application Ser. No. 11/461,164, titled "Database for Mixed Media Document System," filed Jul. 31, 2006; U.S. patent application Ser. No. 11/461,109, titled "Searching Media Content For Objects Specified Using Identifiers," filed Jul. 31, 2006; U.S. patent application Ser. No. 12/059,583, titled "Invisible Junction Feature Recognition For Document Security Or Annotation," filed Mar. 31, 2008; U.S. patent application Ser. No. 12/121,275, titled "Web-Based Content Detection In Images, Extraction And Recognition," filed May 15, 2008; U.S. patent application Ser. No. 11/776,510, titled "Invisible Junction Features For Patch Recognition," filed Jul. 11, 2007; U.S. patent application Ser. No. 11/776,520, titled "Information Retrieval Using Invisible Junctions and Geometric Constraints," filed Jul. 11, 2007; U.S. patent application Ser. No. 11/776,530, titled "Recognition And Tracking Using Invisible Junctions," filed Jul. 11, 2007; and U.S. patent application Ser. No. 11/777,142, titled "Retrieving Documents By Converting Them to Synthetic Text," filed Jul. 12, 2007; and U.S. patent application Ser. No. 11/624,466, titled "Synthetic Image and Video Generation From Ground Truth Data," filed Jan. 18, 2007; which are incorporated by reference in their entirety.

Still referring to FIG. 3, the MMR engine 103 is shown in more detail. The MMR engine 103 includes a quality assessment module 302, an image processing module 304, a feature extraction module 306, a retrieval module 308 and an action module 310.

The quality assessment module 302 is software and routines for receiving an image and assessing the quality of the image. In one embodiment, the quality assessment module 302 is a set of instructions executable by the processor 335 to provide the functionality described below for receiving an image and assessing the quality of the image. In another embodiment, the quality assessment module 302 is stored in the memory 337 and is accessible and executable by the processor 335. In either embodiment, the quality assessment module 302 is adapted for cooperation and communication with the processor 335, the communication unit 340, the image processing module 304, the feature extraction module 306 and other components of the MMR server 104 via signal line 342.

The quality assessment module 302 receives an image from a user device 115 via the communication unit 340. The received image contains any matchable portion of a source document, such as a patch of text, a single word, non-text patch (for example, a barcode, a photo, etc.), an entire source document, etc. In one embodiment, the received image is captured by a user 125 using the user device 115. The quality assessment module 302 makes a preliminary judgment about the content of the captured image based on the needs and capabilities of the MMR engine 103 and transmits a notification to the image processing module 304. In one embodiment, if the captured image is of such quality that it cannot be processed downstream by the image processing module 304 or the feature extraction module 306, the quality assessment module 302 transmits feedback to the user device 115 via the communication unit 340. The feedback, for example, includes an indication in the form of a sound or vibration that indicates that the image contains something that looks like text but is blurry and that the user should recapture the image. In another embodiment, the feedback includes commands that change parameters of the optics (for example, focal length, exposure, etc.) of the user device 115 to improve the quality of the image. In yet another embodiment, the feedback is specialized by the needs of a particular feature extraction algorithm used by the MMR engine 103.

In one embodiment, the quality assessment module 302 performs textual discrimination so as to, for example, pass through only images that are likely to contain recognizable text. Further, the quality assessment module 302 determines whether the image contains something that could be a part of a document. For example, an image patch that contains a non-document image (such as a desk or an outdoor view) indicates that a user is transitioning the view of the user device 115 to a new document.

The image processing module 304 is software and routines for modifying an image based on the needs of the MMR engine 103. In one embodiment, the image processing module 304 is a set of instructions executable by the processor 335 to provide the functionality described below for modifying an image. In another embodiment, the image processing module 304 is stored in the memory 337 and is accessible and executable by the processor 335. In either embodiment, the image processing module 304 is adapted for cooperation and communication with the processor 335, the quality assessment module 302, the feature extraction module 306 and other components of the MMR server 104 via signal line 344.

In one embodiment, the image processing module 304 receives a notification from the quality assessment module 302 and dynamically modifies the quality of the received image. Examples of types of image modification include sharpening, deskewing, binarization, blurring, etc. Such algorithms include many tunable parameters such as mask sizes, expected rotations, thresholds, etc. In another embodiment, the image processing module 304 dynamically modifies the image based on feedback received from the feature extraction module 306. For example, a user will point the user device 115 at the same location of a source document 118 for several seconds continuously. Given that, for example, the user device 115 processes 30 frames per second, the results of processing the first few frames in any sequence will be used to affect how the frames capture are later processed.

The feature extraction module 306 is software and routines for extracting features from an image. In one embodiment, the feature extraction module 306 is a set of instructions executable by the processor 335 to provide the functionality described below for extracting features. In another embodiment, the feature extraction module 306 is stored in the memory 337 and is accessible and executable by the processor 335. In either embodiment, the feature extraction module 306 is adapted for cooperation and communication with the processor 335, the quality assessment module 302, the image processing module 304, the retrieval module 308 and other components of the MMR server 104 via signal line 346.

The feature extraction module 306 converts the received image into a symbolic representation, extracts features and transmits them to the retrieval module 308. In one embodiment, the feature extraction module 306 locates characters, words, patches of text, images etc. and computes their bounding boxes. In another embodiment, the feature extraction module 306, determines two-dimensional relationships between different objects within the received image. In another embodiment, the feature extraction module 306 locates connected components and calculates descriptors for their shape. In another embodiment, the feature extraction module 306 extracts the font type and size of text in the image. In yet another embodiment, the feature extraction module 306 shares data about the results of feature extraction by providing feedback to other components of the MMR engine 103. Those skilled in the art will note that this significantly reduces computational requirements and improves accuracy by inhibiting the recognition of poor quality data. For example, a feature extraction module 306 that identifies word bounding boxes provides feedback to the image processing module 304 about the number of lines and words it found. If the number of words is too high (indicating, for example, that the received image is fragmented), the image processing module 304 produces blurrier images by applying a smoothing filter.

Figure 4A:
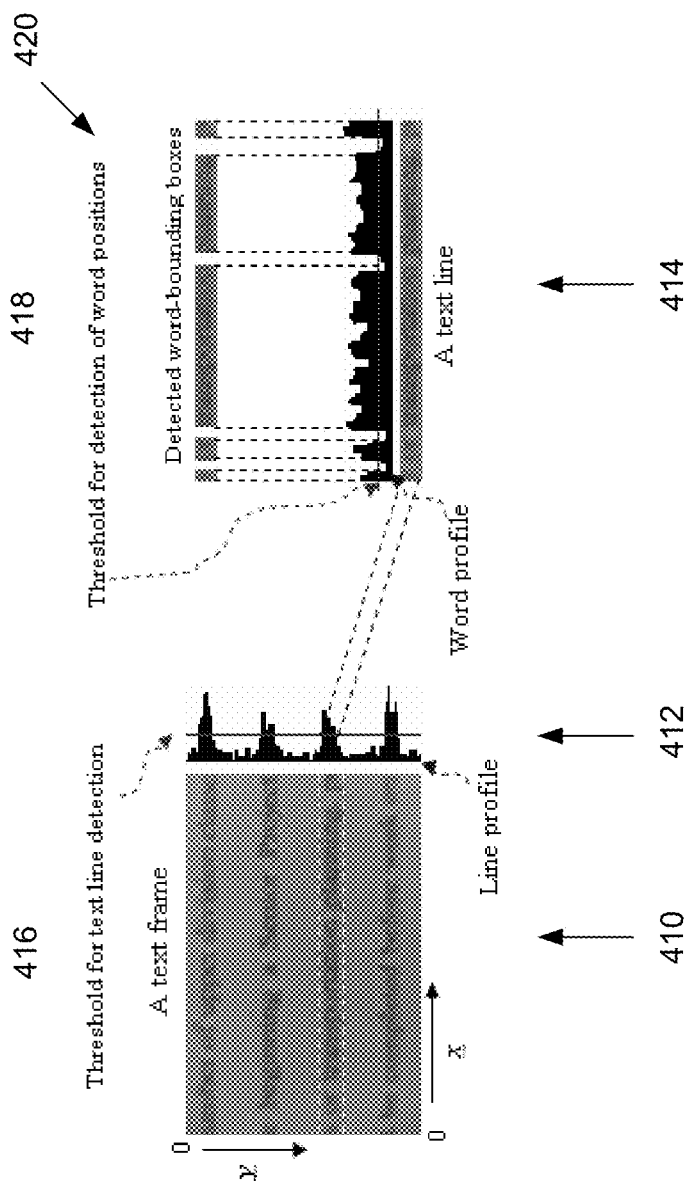
FIGS. 4A-4D are graphic representations of different approaches for performing visual search.

FIG. 4A shows an example of a word bounding box detection algorithm. The feature extraction module 306 computes a horizontal projection profile 412 of the received image 410. A threshold for line detection is chosen 416 by known adaptive thresholding or sliding window algorithms in such a way that the areas above threshold correspond to lines of text. The areas within each line are extracted and processed in a similar fashion 414 and 418 to locate areas above threshold that are indicative of words within lines. An example of the bounding boxes detected in one line of text is shown in 420.

Figure 4B:
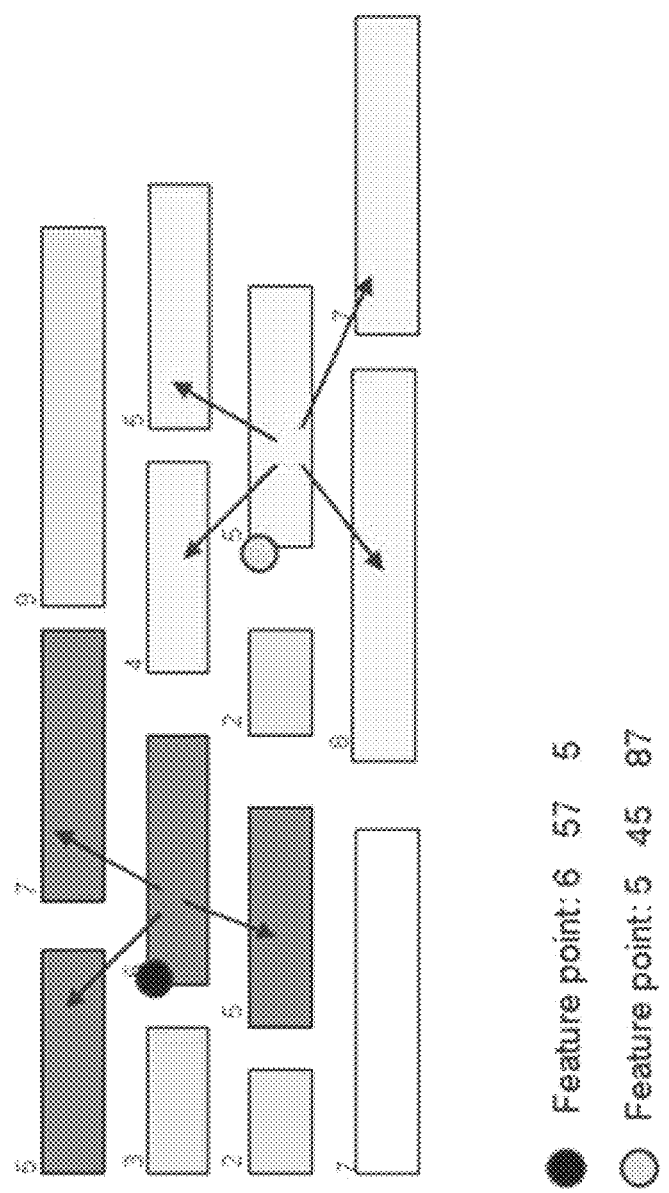

In one embodiment, various features, such as Scale Invariant Feature Transform (SIFT) features, corner features, salient points, ascenders, descenders, word boundaries and spaces are extracted. In a further embodiment, groups are formed with the detected word boundaries as shown in FIG. 4B. In FIG. 4B, for example, vertical groups are formed in such a way that a word boundary has both above and below overlapping word boundaries and the total number of overlapping word boundaries is at least three (a person with ordinary skill in the art would recognize that the minimum number of overlapping word boundaries will differ in one or more embodiments). For example, a first feature point, (second word box in the second line, length of 6) has two word boundaries above (lengths of 5 and 7) and one word boundary below (length of 5). A second feature point, (fourth word box in the third line, length of 5) has two word boundaries above (lengths of 4 and 5) and two word boundaries below (lengths of 8 and 7). Thus as shown in FIG. 4B, the indicated features are represented with the length of the middle word boundary followed by the lengths of the above word boundaries and then by the lengths of the below word boundaries. Further, a person with ordinary skill in the art would recognize that the lengths of the word boxes may be based on any metric. Thus, it is possible to have alternate lengths for some word boxes. In such cases, features are extracted containing all or some of their alternatives.

Figure 4C:
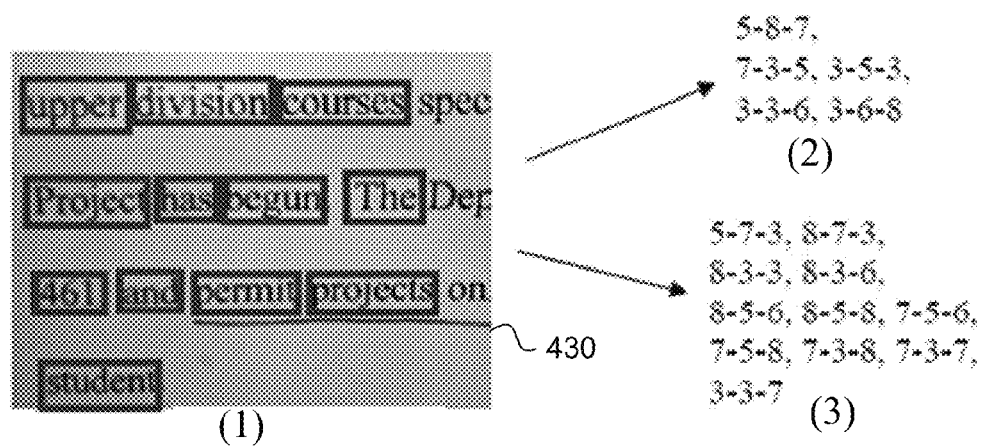

In another embodiment, the feature extraction module 306 determines horizontal and vertical features of the received image. This is performed in view of the observation that an image of text contains two independent sources of information as to its identity—in addition to the horizontal sequence of words, the vertical layout of the words can also be used to identify an MMR object. For example, as shown in FIG. 4C, (1) a received image 430 with word bounding boxes is shown. Using the word bounding boxes, horizontal and vertical "n-grams" are determined. An n-gram is a sequence of n numbers each describing a quantity of some characteristic.

For example, a horizontal trigram specifies the number of characters in each word of a horizontal sequence of three words. For example, the received image, (2) shows horizontal trigrams: 5-8-7 (for the number of characters in each of the horizontally sequenced words "upper", "division", and "courses" in the first line of the received image 430); 7-3-5 (for the number of characters in each of the horizontally sequenced words "Project," "has," and "begun" in the second line of the received image 430); 3-5-3 (for the number of characters in each of the horizontally sequenced words "has," "begun," and "The" in the second line of the received image 430); and 3-3-6 (for the number of characters in each of the horizontally sequenced words "461," "and," and "permit" in the third line of the received image 430). Similarly, a vertical trigram specifies the number of characters in each word of a vertical sequence of words above and below a given word. For example, for the received image 430, (3) shows vertical trigrams: 5-7-3 (for the number of characters in each of the vertically sequenced words "upper", "Project", and "461"); and 8-7-3 (for the number of characters in each of the vertically sequenced words "division", "Project", and "461").

Figure 4D:
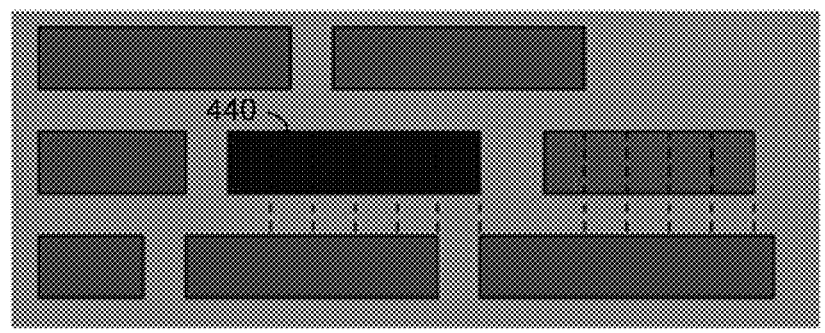

In another embodiment, angles from each feature point to other feature points are computed. Alternatively, angles between groups of feature points are calculated. In yet another embodiment, features are extracted such that spaces are represented with 0s and word regions are represented with 1s. In yet another embodiment, the extracted features are based on the lengths of words. Each word is divided into estimated letters based on the word height and width. As the word line above and below a given word are scanned, a binary value is assigned to each of the estimated letters according to the space information in the lines above and below. The binary code is then represented with an integer number. For example, referring to FIG. 4D, it shows an arrangement of word boxes each representing a word detected in a captured image. The word 440 is divided into estimated letters. This feature is described with (1) the length of the word, (2) the text arrangement of the line above the word 440 and (3) the text arrangement of the line below the word 440. The text arrangement information is extracted from binary coding of the space information above or below the current estimated letter. In word 440, only the last estimated letter is above a space, the second and third estimated letters are below a space. Accordingly, the feature word 440 is coded as (6, 100111, 111110), where 0 means space and 1 means no space. Rewritten in integer form, word 440 is coded as (6, 39, 62). The extracted features are then transmitted to the retrieval module 308.

Turning back to FIG. 3, the retrieval module 308 is software and routines for receiving the extracted features of an image and retrieving an MMR object that contains the image. In one embodiment, the retrieval module 308 is a set of instructions executable by the processor 335 to provide the functionality described below for identifying an MMR object. In another embodiment, the retrieval module 308 is stored in the memory 337 and is accessible and executable by the processor 335. In either embodiment, the retrieval module 308 is adapted for cooperation and communication with the processor 335, the MMR database 105, the image processing module 304, the feature extraction module 306, the action module 310 and other components of the MMR server 104 via signal line 348.

The retrieval module 308, according to one embodiment, receives the features from the feature extraction module 306 and performs pattern matching to retrieve one or more MMR objects from the MMR database 105 that contain the received image. In a further embodiment, the retrieval module identifies and retrieves one or more pages of the MMR object and the x-y positions within those pages where the image occurs.

The retrieval module 308 uses one or more techniques for retrieving MMR objects such as a feed-forward technique, an interactive image analysis technique, a generate and test technique, a multiple classifier technique, a database-driven feedback technique, a database-driven classifier technique, a database-driven multiple classifier technique, a video sequence image accumulation technique, a video sequence feature accumulation technique, a video sequence decision combination technique, a multi-tier recognition technique, etc. The above mentioned retrieval techniques are disclosed in U.S. patent application Ser. No. 11/461,017, titled "System And Methods For Creation And Use Of A Mixed Media Environment," filed Jul. 31, 2006; U.S. patent application Ser. No. 11/461,279, titled "Method And System For Image Matching In A Mixed Media Environment," filed Jul. 31, 2006; U.S. patent application Ser. No. 11/461,286, titled "Method And System For Document Fingerprinting Matching In A Mixed Media Environment," filed Jul. 31, 2006; U.S. patent application Ser. No. 11/461,294, titled "Method And System For Position-Based Image Matching In A Mixed Media Environment," filed Jul. 31, 2006; U.S. patent application Ser. No. 11/461,300, titled "Method And System For Multi-Tier Image Matching In A Mixed Media Environment," filed Jul. 31, 2006; U.S. patent application Ser. No. 11/461,147, titled "Data Organization and Access for Mixed Media Document System," filed Jul. 31, 2006; U.S. patent application Ser. No. 11/461,164, titled "Database for Mixed Media Document System," filed Jul. 31, 2006; U.S. patent application Ser. No. 11/461,109, titled "Searching Media Content For Objects Specified Using Identifiers," filed Jul. 31, 2006; U.S. patent application Ser. No. 12/059,583, titled "Invisible Junction Feature Recognition For Document Security Or Annotation," filed Mar. 31, 2008; U.S. patent application Ser. No. 12/121,275, titled "Web-Based Content Detection In Images, Extraction And Recognition," filed May 15, 2008; U.S. patent application Ser. No. 11/776,510, titled "Invisible Junction Features For Patch Recognition," filed Jul. 11, 2007; U.S. patent application Ser. No. 11/776,520, titled "Information Retrieval Using Invisible Junctions and Geometric Constraints," filed Jul. 11, 2007; U.S. patent application Ser. No. 11/776,530, titled "Recognition And Tracking Using Invisible Junctions," filed Jul. 11, 2007; and U.S. patent application Ser. No. 11/777,142, titled "Retrieving Documents By Converting Them to Synthetic Text," filed Jul. 12, 2007; and U.S. patent application Ser. No. 11/624,466, titled "Synthetic Image and Video Generation From Ground Truth Data," filed Jan. 18, 2007; which are each incorporated by reference in their entirety.

The action module 310 is software and routines for performing an action associated with the retrieved MMR object. In one embodiment, the action module 310 is a set of instructions executable by the processor 335 to provide the functionality described below for performing an action. In another embodiment, the action module 310 is stored in the memory 337 and is accessible and executable by the processor 335. In either embodiment, the action module 310 is adapted for cooperation and communication with the processor 335, the communication unit 340, the MMR database 105, the retrieval module 308 and other components of the MMR server 104 via signal line 350.

Once the retrieval module 308 identifies the MMR object, the page and the x-y location within the MMR object, the action module 310 performs one or more actions associated with it. The action is any action performable by the processor 335, such as retrieving data associated with the MMR object and/or data that is specifically linked to the x-y location (such as a video clip, a menu to be displayed on the user device, a product specification, metadata from the content management server 150, other MMR objects that are related to the MMR object identified by the retrieval module 308, etc.), retrieving information (such as text, images, etc.) around the identified x-y location, inserting data at the x-y location, accessing or transmitting a request to an external server or database (such as the social network server 101 to retrieve a conversation associated with the identified MMR object or the content management server 150 to retrieve metadata associated with the MMR object), etc. In one embodiment, the action module 310 transmits the retrieved MMR object to the social network server 101. The action module 310 communicates with the user device 115 and the external servers or databases via the communication unit 340.

Social Network Application 109

Figure 5:
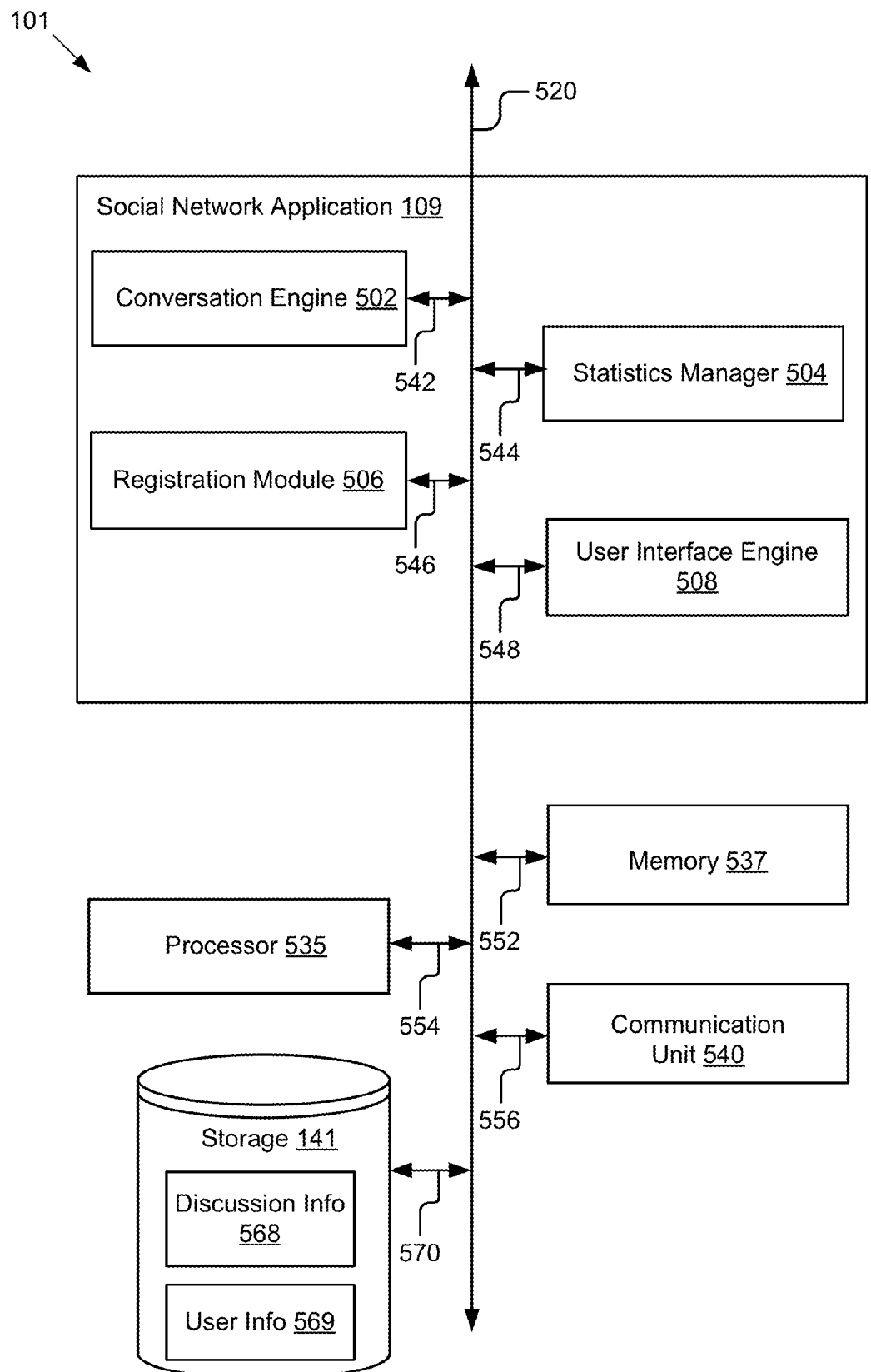
FIG. 5 is a block diagram of one embodiment of the social network application in more detail.

Referring now to FIG. 5, the social network application 109 is shown in more detail. FIG. 5 is a block diagram of a social network server 101 that includes the social network application 109, a processor 535, a memory 537, a communication unit 540 and storage 141. The processor 535, the memory 537, the communication unit 540 and the storage 141 are coupled to the bus 520 via signal lines 554, 552, 556 and 570, respectively.

Those skilled in the art will recognize that some of the components of the social network server 101 have the same or similar functionality to the components of the MMR server 104 so descriptions of these components will not be repeated here. For example, the processor 535, the memory 537 and the communication unit 540 have a similar functionality to the processor 335, the memory 337 and the communication unit 340 of FIG. 3, respectively.

The storage device 141, a non-transitory memory comprises discussion information 568 and user information 569. The discussion information 568 includes all information relating to conversations and discussion groups. For example, the discussion information 568 includes a list of conversations and discussion groups, discussion threads associated with the conversations and discussion groups, cluster groups, a list of users that have access to the conversations and discussion groups, comments and replies associated with the discussion threads, a time of the last activity within a discussion thread (which is later used to determine whether the group is still active), a list of MMR objects associated with a conversation thread or discussion group, proximity information, etc. The user information 569 includes the registered username, and password of all the users that registered with the social network application 109. In another embodiment, the user information 569 also includes social data about the user such as actions on one or more social networks and/or other information about the user (e.g., the user's gender, age, email address, education, past and present employers, geographic location, friends and the actions of the user's friends on one or more social networks). In another embodiment, the social data can be stored as a social graph in the user information 569.

In one embodiment, the social network application 109 comprises a conversation engine 502, a statistics manager 504, a registration module 506 and a user interface engine 508 that are coupled to the bus 520.

The conversation engine 502 is software including routines for managing a conversation or a discussion group. A conversation includes one or more discussion threads that are all associated with the same MMR object (i.e. the same source material). A discussion group includes discussion threads that are based on related source material or proximity. In one embodiment, the discussion group is based on a cluster, which identifies related source materials. In another embodiment, the discussion group is based on proximity metadata, namely proximity of location and proximity of the time of capturing an image. For ease of understanding, references to discussion threads include discussion threads that are part of a conversation or a discussion group. A discussion thread comprises an electronic image of the source material that corresponds to the MMR object that is captured by the user, a comment by the user on the matching MMR object and replies received from others users based on the comment.

In one embodiment, the conversation engine 502 is a set of instructions executable by the processor 535 to provide the functionality described below for initiating and/or retrieving conversations or discussion groups. In another embodiment, the conversation engine 502 is stored in the memory 537 and is accessible and executable by the processor 535. In either embodiment, the conversation engine 502 is adapted for cooperation and communication with the processor 535, the communication unit 540, storage 141, user interface engine 508 and other components of the social network server 101 via signal line 542.

According to one embodiment, the conversation engine 502 receives an MMR object and an identification of the user that captured an image corresponding to the MMR object from the MMR engine 103. In this embodiment, the MMR engine 103 identifies the MMR object by performing a visual search using an image received from the user device 115. Responsive to receiving the MMR object, the conversation engine 502 retrieves existing conversations or discussion groups associated with the MMR object from the discussion information 568 and/or initiates a new discussion thread for the MMR object. In another embodiment, the conversation engine 502 retrieves metadata associated with the MMR object 200 from the content management server 150. The conversation engine 502 provides the user with access to a conversation or discussion group by sending a notification including the retrieved discussion threads, conversations, newly created discussion thread, metadata, etc. to the user interface engine 508 for generating a user interface. The conversation engine 502 further receives comments, replies or indications of approval posted by a user 125 from the user device 115 and indexes them to their corresponding discussion threads or conversations in the discussion information 568. In one embodiment, the conversation engine 502 transmits the indexed information to the content management server 150, which stores the information as metadata that is associated with the MMR object.

In one embodiment, the conversation engine 502 also receives cluster group information from the content management server 150 and, if the discussion group already exists, provides the user with access to the discussion group. If the discussion group does not exist, the conversation engine 502 generates a discussion thread. In yet another embodiment, the conversation engine 502 compares user comments to the cluster groups and provides users with access to the corresponding discussion groups if the comments are similar to the cluster groups.

In another embodiment, the MMR object received by the conversation engine 502 includes proximity information for the user device 115a. The proximity information comprises at least one of a location and a time at which the user device 115a sends a request to the MMR server 104 to identify an MMR object. The conversation engine 502 retrieves existing discussion threads or discussion groups that are associated with the MMR object, based on the proximity information. For example, the conversation engine 502 retrieves discussion threads from the discussion information 568 that were initiated by other user devices 115n within a certain time or located within a certain distance from the received proximity information. In another example, the conversation engine 502 retrieves discussion threads that are currently active and were initiated by other user devices 115n located within a certain distance. If a discussion group does not already exist, the conversation engine 502 applies a comparison algorithm to determine similarity of discussion threads that are within a window of time or a radius of allowance for newly established discussion threads. The window of time is fixed, for example, three hours or 24 hours or the window adjusts dynamically according to the user activity, for example, an active community of users is clustered in a larger time window to avoid a fragmentation of the discussion group.

In one embodiment, the conversation engine 502 dynamically generates a discussion group that includes discussion threads based on the same or similar source material that share the same proximity information and stores them in the discussion information 568 to make their retrieval faster and efficient. In a further embodiment, the conversation engine 502 generates the discussion group based on user information and the social graph stored in the user information 569. For example, the conversation engine 502 groups the discussion threads that were initiated by users who are classmates.

In yet another embodiment, the conversation engine 502 controls access to certain discussion threads based on permissions. For example, a teacher is designated as an administrator and sets up permissions for the teaching assistants to view problem sets and answer keys, but limits student access to only discussion threads regarding problem sets and study groups. The permissions information is a subset of the access information that is stored as discussion information 568 in the storage 141.

The conversation engine 502 also monitors the discussion threads to remove inactive threads from a conversation or discussion group. In one embodiment, the conversation engine 502 removes or deactivates a discussion thread from a group after a certain amount of time (for example 2 hours, one day, etc.). In another embodiment, the conversation engine 502 removes a discussion thread from the group if there is no activity in the discussion thread for a certain amount of time.

The statistics manager 504 is software including routines for analyzing the popularity of source material and individual discussion threads based on the source material. In one embodiment, the statistics manager 504 is a set of instructions executable by the processor 535 to provide the functionality described below for tracking the popularity of discussion groups, conversations and source materials. In another embodiment, the statistics manager 504 is stored in the memory 537 and is accessible and executable by the processor 535. In either embodiment, the statistics manager 504 is adapted for cooperation and communication with the processor 535 and other components of the social network server 101 via signal line 544.

The discussion threads are formatted to receive likes and replies from users on the social network via the user interface. The statistics manager 504 stores the number of likes and replies received for each discussion thread as discussion information 568. In addition, the number of electronic images of the same source material, each used by different users to start a discussion thread is also stored as discussion information 568. In one embodiment, the statistics manager 504 tracks the statistics (number of likes and comments) for each conversation and discussion group. In another embodiment, the statistics manager 504 transmits the statistics corresponding to conversations and discussion groups in the form of spreadsheets to the user interface engine 508 for authors of the source materials to use for their own purposes.

The registration module 506 is software including routines for registering users on the social network server 101. In one embodiment, the registration module 506 is a set of instructions executable by the processor 535 to provide the functionality described below for registering users on the social network server 101. In another embodiment, the registration module 506 is stored in the memory 537 and is accessible and executable by the processor 535. In either embodiment, the registration module 506 is adapted for cooperation and communication with the processor 535 and other components of the social network server 101 via signal line 546.

The registration module 506 registers users on the social network server 101 with their chosen username and password and stores such information as user information 569 in the storage 141. In one embodiment, the users' email addresses serve as their usernames. The registration module 506 also places restrictions on the type of characters chosen for creating the password to protect the user information 569 on the social network server 101. When a registered user tries to login to the social network, the registration module 506 authenticates the entered username and password with the registered username and password. When the entered password fails to match the registered password in the user information 569, the registration module 506 requests the user's email address for sending an automated email for resetting the password. Persons of ordinary skill in the art will understand that there are other ways to establish a username, password and authentication steps.

The user interface engine 508 is software including routines for generating a user interface that displays a user profile, a conversation including discussion threads, a discussion group including discussion threads and an overview of all the social network application 109 features. In one embodiment, the user interface engine 508 is a set of instructions executable by the processor 535 to generate the user interface. In another embodiment, the user interface engine 508 is stored in the memory 537 of the social network server 101 and is accessible and executable by the processor 535. In either embodiment, the user interface engine 508 is adapted for cooperation and communication with the processor 535 and other components of the social network server 101 via signal line 548.

In one embodiment, responsive to a user requesting the user interface, the user interface engine 508 receives from the conversation engine 502 or retrieves from storage 141 the conversations and discussion groups that are associated with a user. The user interface engine 508 transmits the user interface to the access module 113 via the communication unit 540. The conversation includes all discussion threads related to the same source material. The discussion groups are grouped according to related source materials or proximity in time or location. In one embodiment, the discussion groups are further modified according to the permissions associated with the user. For example, a teacher has permission to see everything relating to the teacher's class, including problem sets, homework and test questions. A student, on the other hand, only has permission to view problem sets and study group information. In another example, the students create permissions for discussion threads relating to a study group and the students limit access to those discussion threads so that only active members of the study group obtain the material.

Creating Conversations and Discussion Threads

Figure 6A:
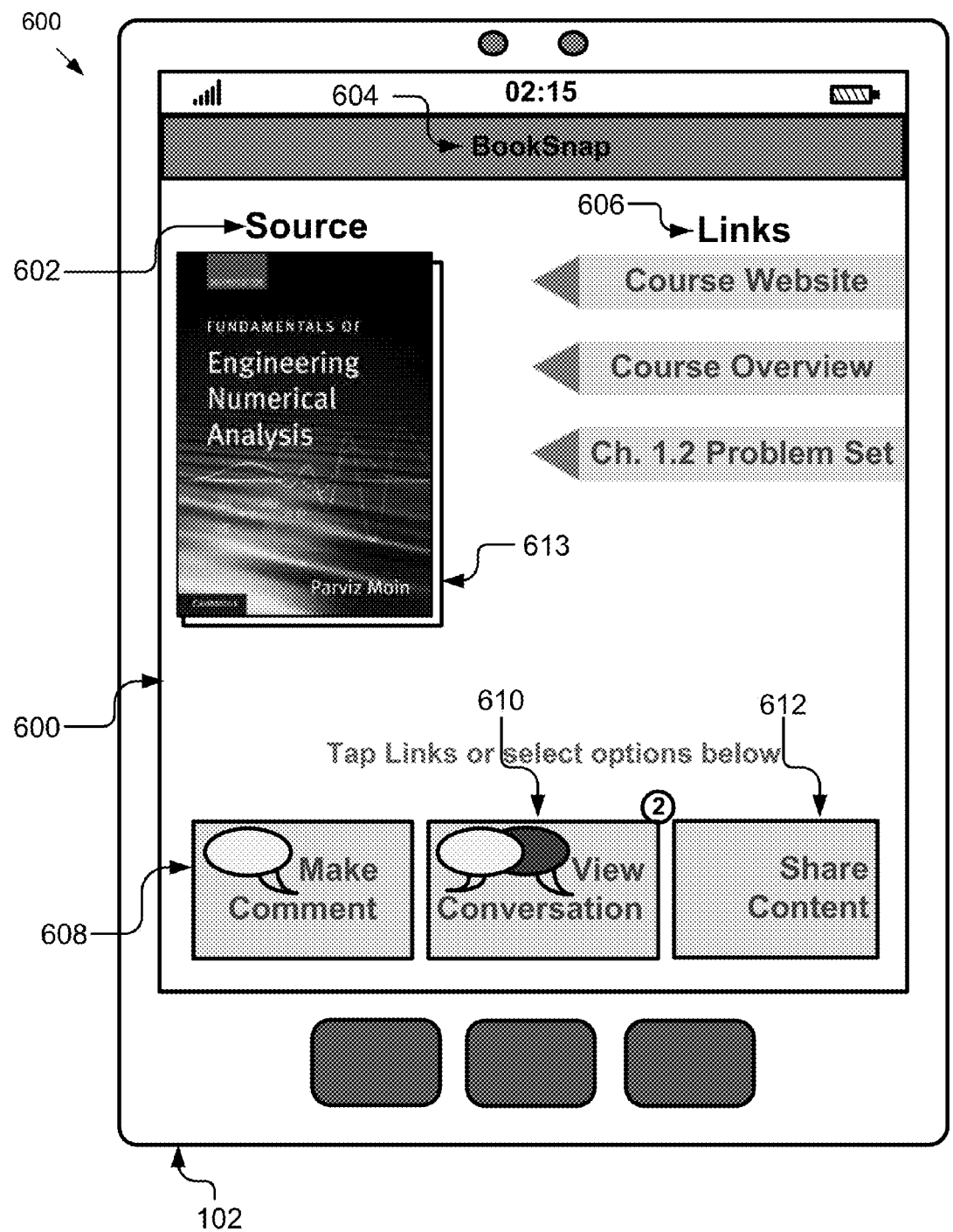

FIG. 6A is an example of a graphic representation of a user interface 600 displayed on a mobile device 102 such as a smart phone that was generated by the social network application 109. In this embodiment, the social network application 109 generates a user interface 600 after the user captures an electronic image of a source material. In this example, the social network application 109 is called BookSnap 604. The user interface 600 includes the identified source 602 of the source material as a thumbnail 613, links 606 that provide associated information relating to the source 602, social networking options that allow the user to make a comment 608 on the source 602, view conversation 610 about the source 602 and share content 612 about the source 602 on other social networking systems.

Selecting any button under the links 606 section causes the user interface 600 to display online information associated with the source 602. The links 606 are manually authored or dynamically authored by the content management engine 155. Selecting the make comment button 608 causes the user interface 600 to display a new section (not shown) for entering a statement or a question about the source 602. Selecting the view conversation button 610 causes the user interface 600 to display a conversation consolidating all existing discussion threads that refer to the same source 602. Persons of ordinary skill in the art will recognize that the user interface 600 can be modified to display a view discussion group icon for displaying all existing discussion threads that refer to a similar source and/or are within a threshold proximity. The small circle with a number 2 in it indicates that there are two discussions currently available about the source 602, in this example. Selecting the share content button 612 causes the user interface 600 to link other social networking systems to share user's discussion about the source 602.

Figure 6B:
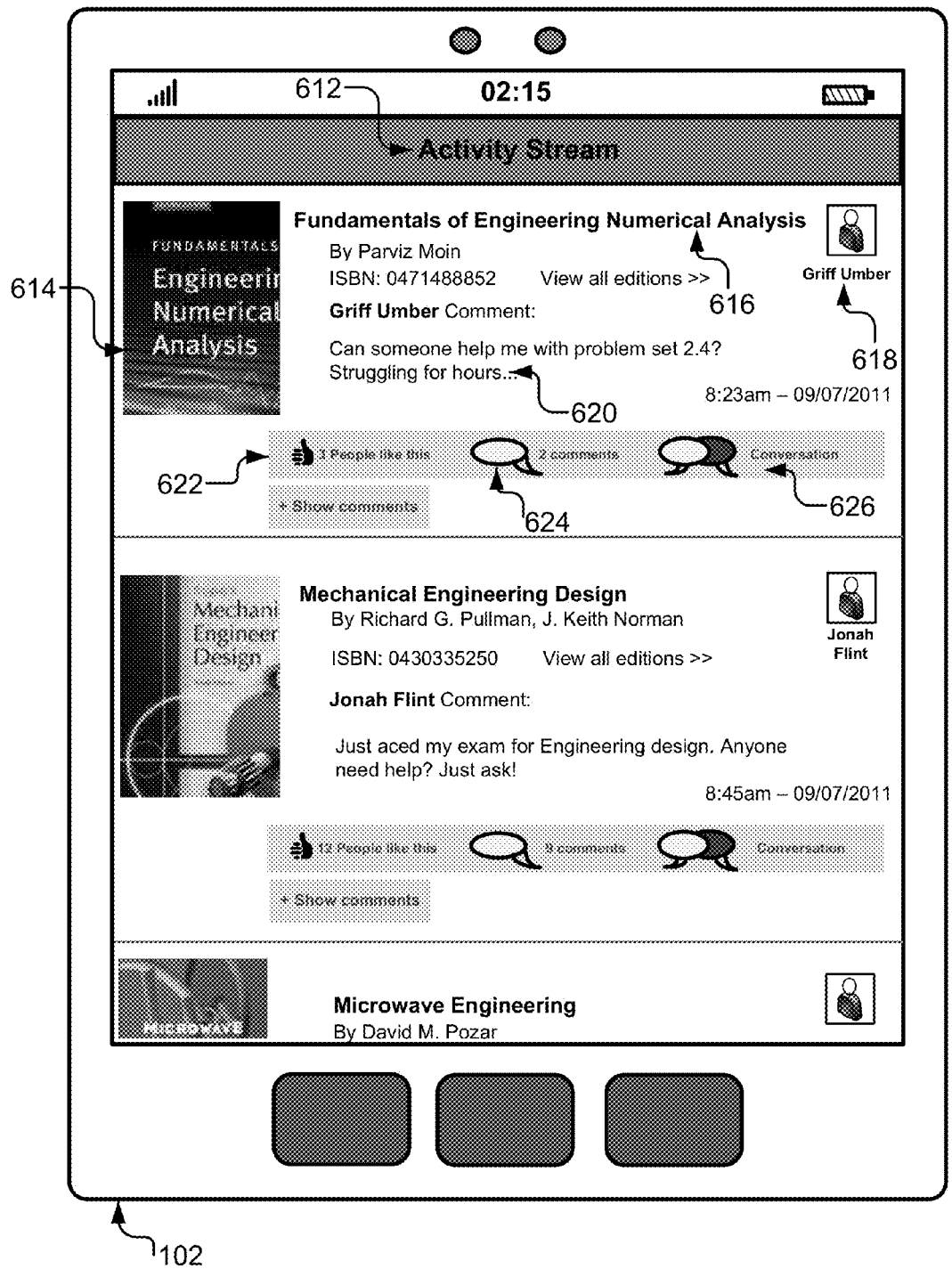

FIG. 6B is a graphic representation of a registered user's view of the social network application 109 on a mobile device 102. In this example, a portion of an activity stream 612 is shown. The activity stream 612 lists the discussions associated with the user on various source materials on a single webpage. In this example, the first entry of the activity stream 612 shows an image 614 of the source material captured by the user, the title 616 of the source material, the profile photo 618 of the user who initiated the discussion thread with a comment 620 on the source material, 622 the number of people who liked the discussion thread, 624 the number of people who replied to the comment 620 and a conversation icon 626 that is a topic-based repository consolidating the discussion threads that refer to the same source material on a single webpage.

Figure 6C:
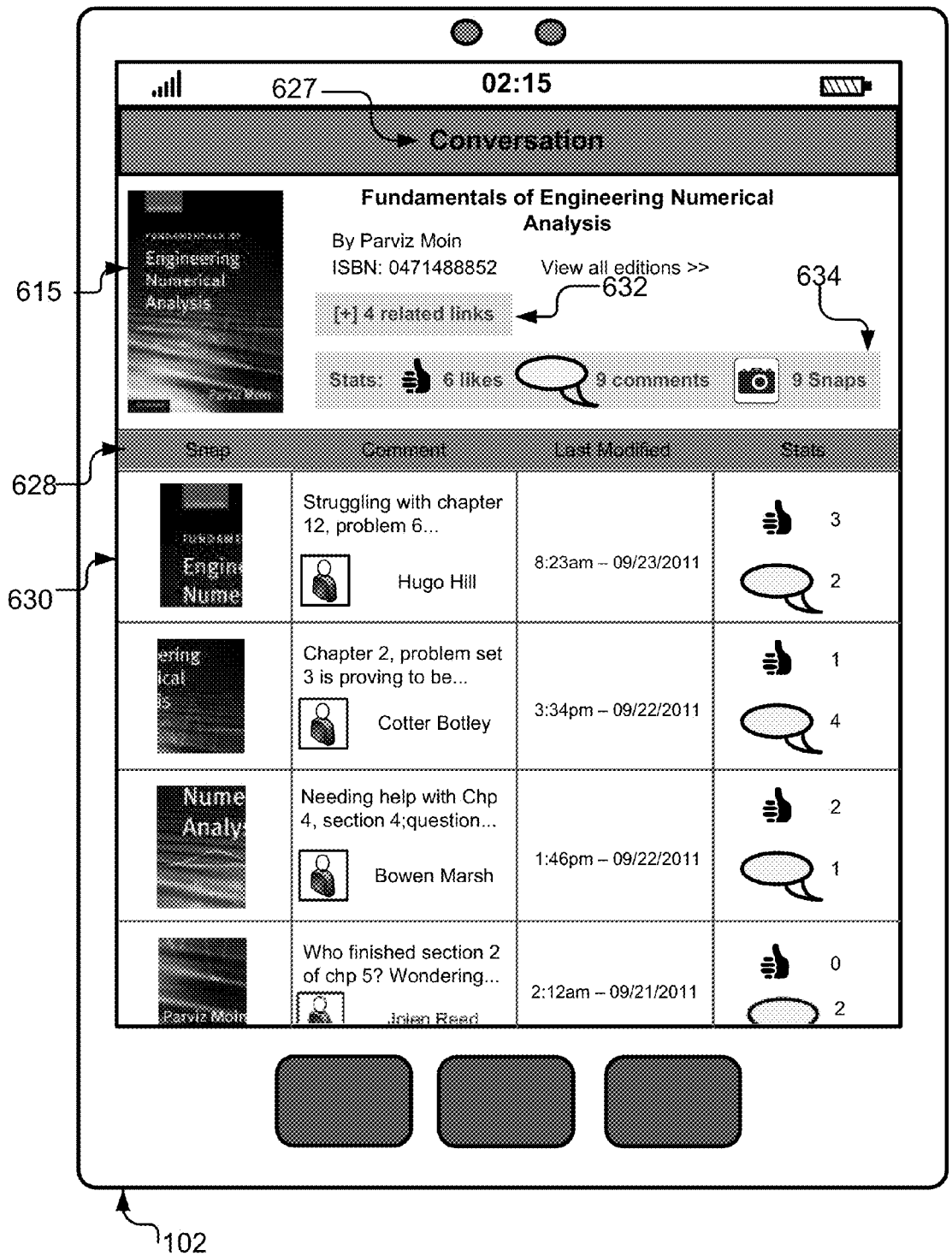

FIG. 6C is a graphic representation that is generated by the user interface engine 508 responsive to the user selecting the conversation icon 626 in from FIG. 6B on a mobile device 102. The conversation 627 lists similar discussions related to the source material in a table 628. Each row 630 in the table 628 is expandable to view comments and participate in the discussion on the same webpage. Each row 630 includes the image of the source material taken by the user, the original comment, the date and time, the discussion stats (number of likes and comments) and the discussion thread author. In addition, the conversation 627 lists 632 related links associated with the identified 615 thumbnail representation of the source material and conversation statistics 634 which list the number of likes, comments and snaps (i.e. discussion groups) that have been aggregated for the conversation 627.

Figure 6D:
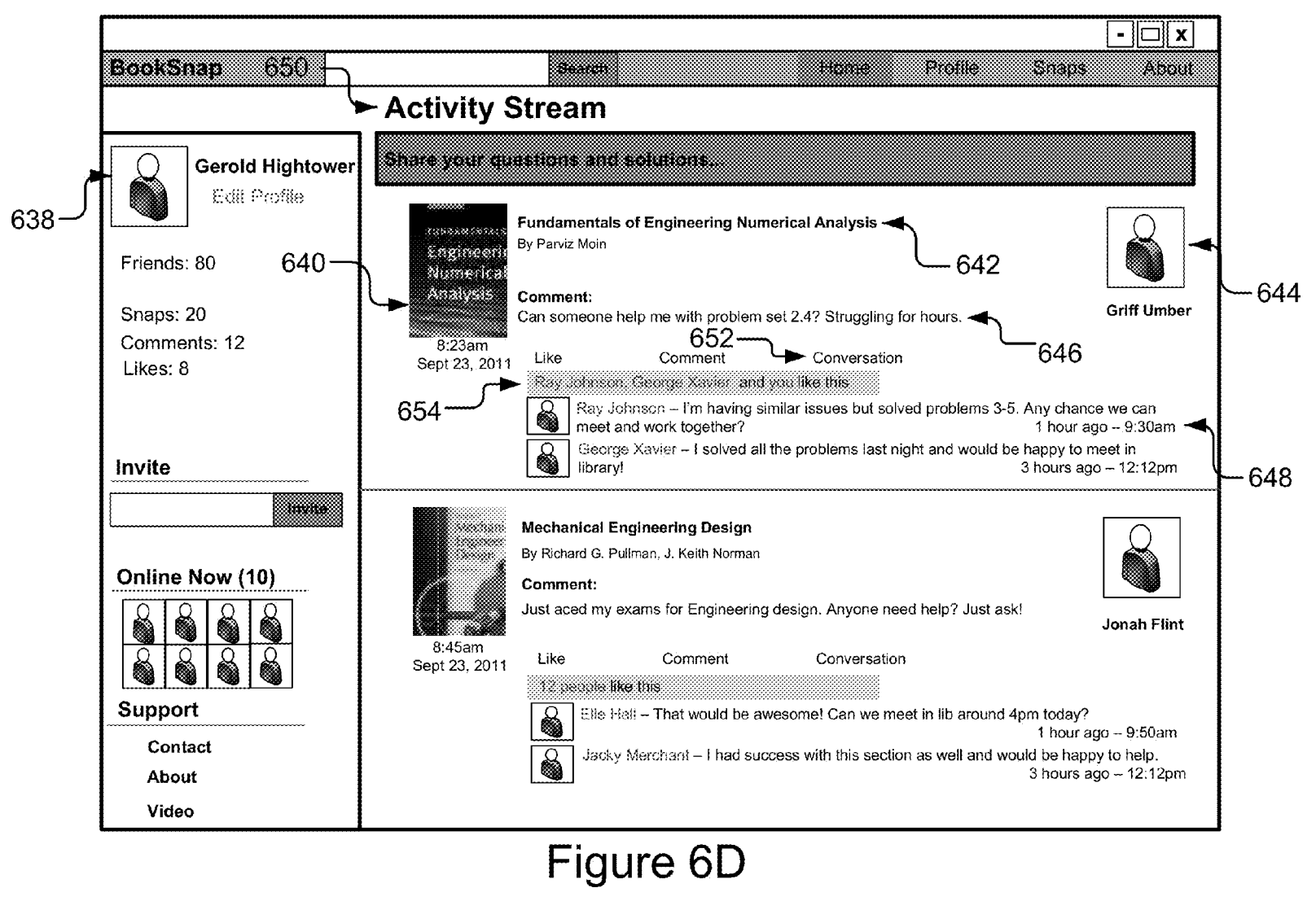

FIG. 6D is a graphic representation of the registered user view of BookSnap that is generated for a device such as a desktop computer, a laptop or a tablet. In this example, a portion of the activity stream 650 for the user 638 is shown. The activity stream 650 lists the discussions associated with the user 638 on various source materials on a single webpage. In this example, the first entry of the activity stream 650 shows an image 640 of the source material captured by the user 638, the title 642 of the source material, the discussion thread author's profile photo 644 who initiated the discussion thread with a comment 646 on the source material and the identification 654 of people who liked the discussion thread, the identification 648 of people who replied to the comment 646 and a conversation 652 that is a topic-based repository consolidating the discussion threads that refer to the same source material on a single webpage.

Figure 6E:
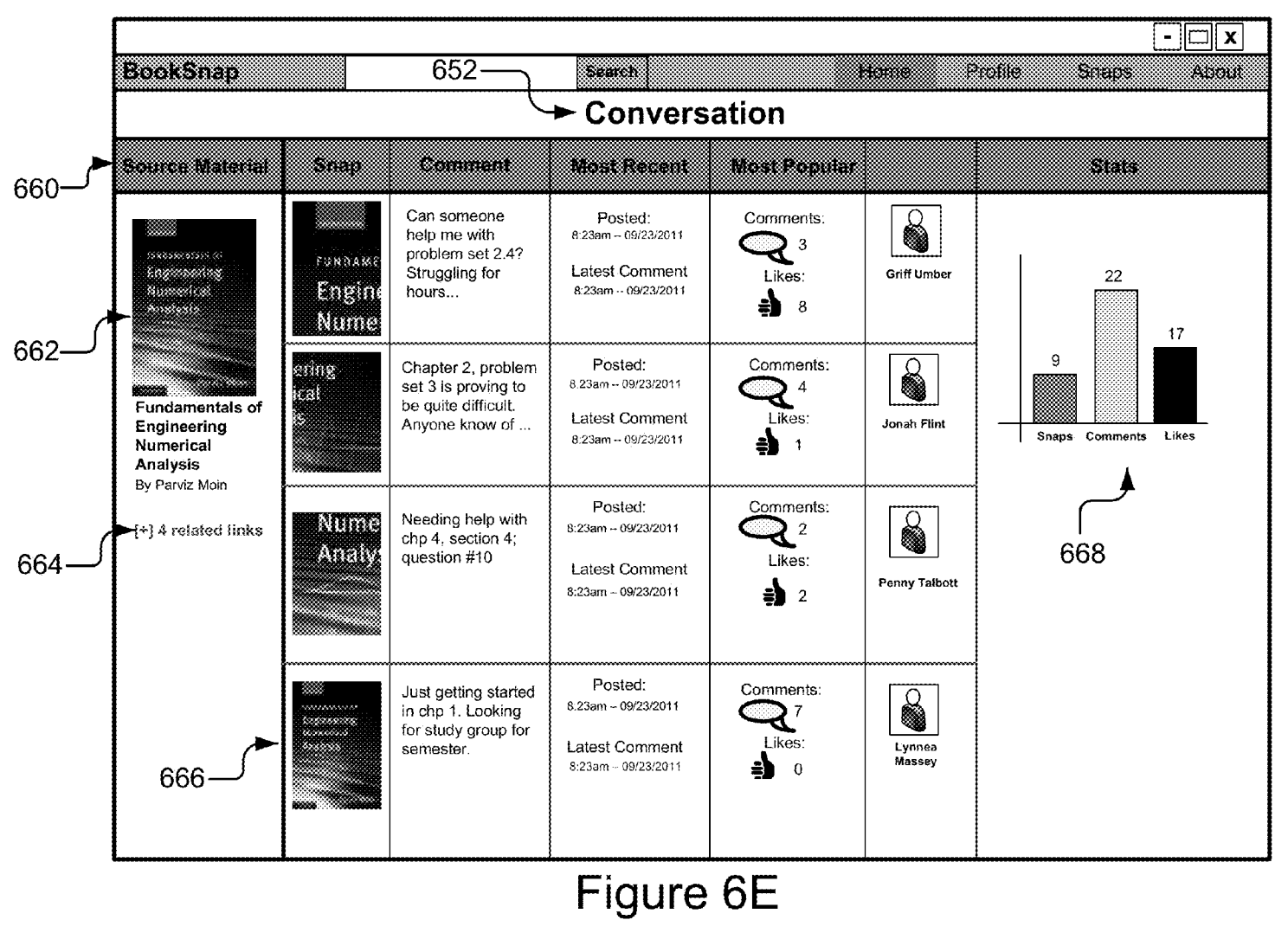

FIG. 6E is another graphic representation of the conversation 652 from FIG. 6D for a device with a wider screen than a mobile device. The conversation 652 lists discussions related to the source material in a table 660. Each row 666 in the table 660 is expandable to view comments and participate in the discussion in the same webpage. Each row 666 includes the image of the source material taken by the user, the original comment, the date and time, the discussion stats (number of likes and comments) and the discussion thread author. In addition, the conversation 652 lists related links 664 associated with the identified thumbnail representation 662 of the source material and conversation statistics 668 that include the number of likes, comments and snaps that are aggregated for the conversation 652.

Figure 6F:
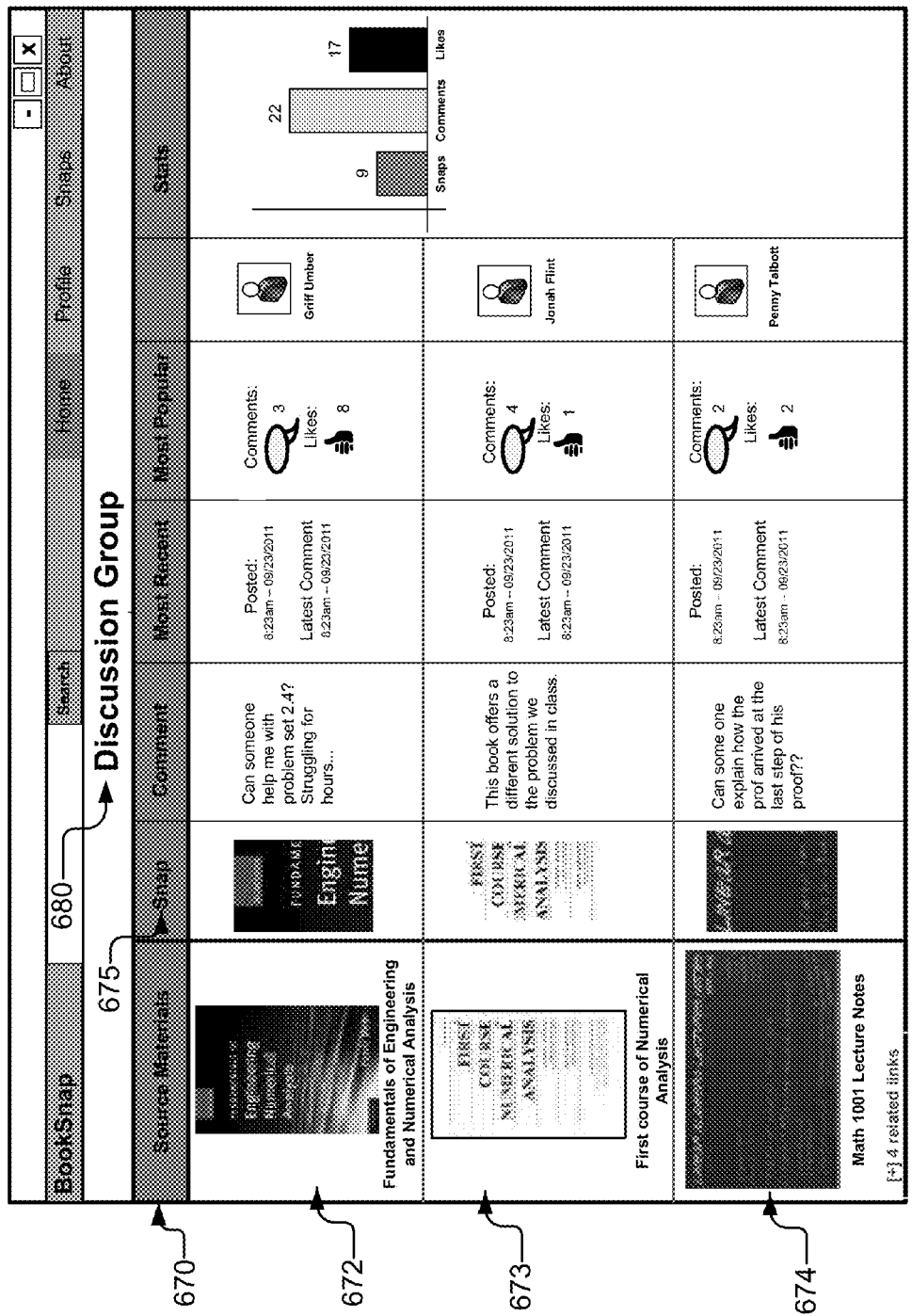

FIG. 6F is a graphic representation of a discussion group 680 for a device with a wider screen than a mobile device. In this example the source materials 670 are related source materials that include a textbook 672 for the class, a related book 673 with a different solution to a problem discussed in class and class notes 674. The snap column illustrates the image captured by the access module 113 in the user device 115. The user in this example obtains access to the discussion group 680 by capturing any of these images because they are all part of the same cluster.

Methods

Figure 7:
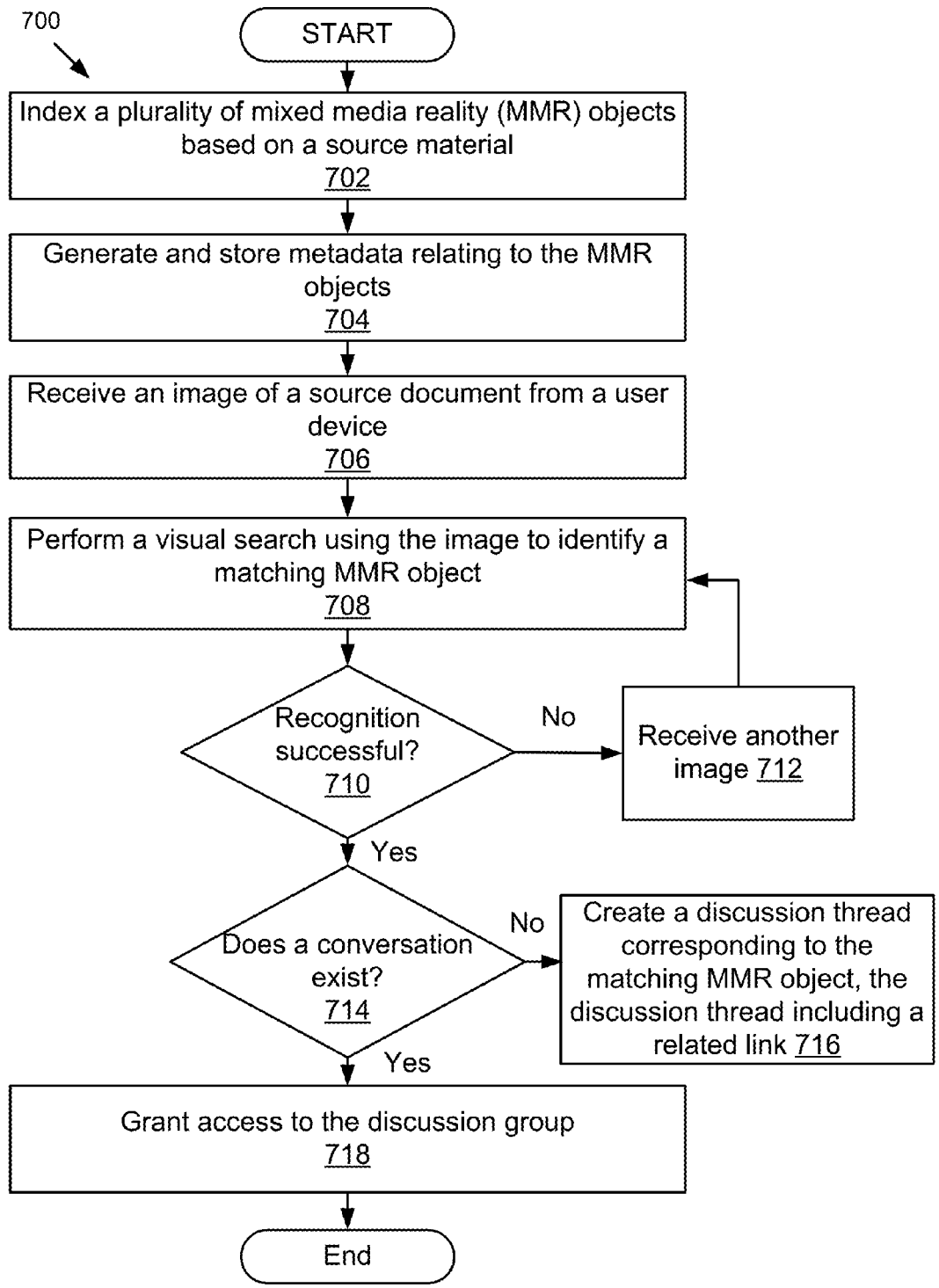
FIG. 7 is a flow diagram of one embodiment of a method for generating a conversation.

Referring now to FIGS. 7-11, the methods of the present embodiment of invention will be described in more detail. FIG. 7 is a flow diagram 700 that illustrates one embodiment of a method for generating a conversation. The MMR server 104 includes an MMR database 105 that indexes 702 a plurality of MMR objects based on a source material. The content management server 150 includes a content management engine 155 that generates 704 and stores metadata relating to the MMR objects in the metadata database 160. In one embodiment, the metadata is generated during an offline process and includes an image of the source material, a name of the source material and tags that describe the source material. In another embodiment, the metadata is updated with information from the social network server 101, such as comments associated with the MMR object.

The MMR server 104 receives 706 an image of a source document from an access module 113 that is stored on a user device 115. The image can be taken from a printed source document or an electronic image. The quality assessment module 302 determines whether the quality of the image is sufficient for identifying the corresponding MMR object. The image processing module 304 dynamically modifies the quality of the received image. The feature extraction module 306 performs 708 a visual search using the image to identify a matching MMR object from the MMR database 105 by performing feature extraction. The retrieval module 308 determines 710 whether the recognition is successful. If the recognition is successful the retrieval module 308 retrieves the MMR object. If the recognition is unsuccessful the retrieval module 308 receives 712 another image from the user device 115 and moves to step 708. The retrieval is unsuccessful if, for example, the quality of the image is too poor to properly extract features from the image. [0101] Responsive to a successful recognition, the action module 310 transmits the MMR object to the social network application 109 via the communication unit 340. The social network application 109 includes a conversation engine 502 that determines 714 whether a conversation exists that corresponds to the MMR object. If not, the conversation engine 502 creates 716 a discussion thread corresponding to the matching MMR object, the discussion thread including a related link. As a result, the conversation includes a single discussion thread. If the conversation does exist, the conversation engine 502 grants 718 the user device 115a access to the discussion group. In one embodiment, the conversation engine 502 instructs the user interface engine 508 to generate a user interface that includes an option for the user to join the conversation. The user interface engine 508 transmits the user interface to the access module 113 on the user device 115a via the communication unit 540.

Figure 8:
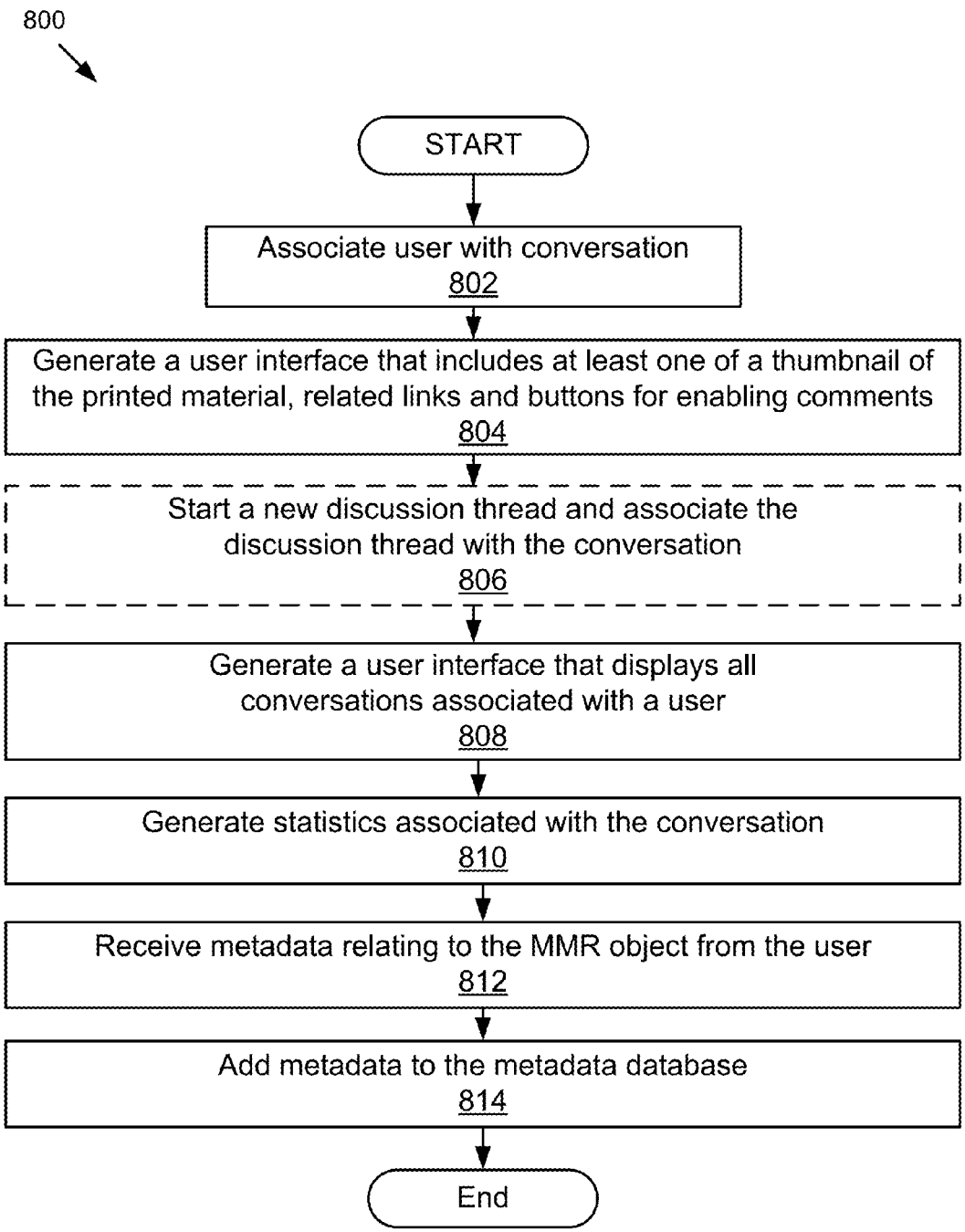
FIG. 8 is a flow diagram of one embodiment of a method for generating a user interface and metadata.

FIG. 8 is a flow diagram 800 that illustrates one embodiment of a method for interacting with the user interface. In one embodiment, FIG. 8 is a continuation of step 718 in FIG. 7. The conversation engine 502 associates 802 the user with a conversation and stores the association as discussion information 568 in storage 141. The user interface engine 508 generates 804 a user interface that includes at least one of an image of the source material (e.g. a thumbnail), related links and a mechanism for enabling comments (e.g. a button or a lever). In response to user input, the conversation engine 502 optionally starts 806 a new discussion thread and associates the discussion thread with the conversation. Discussion threads include, for example, a discussion of the latest reading assignment, a problem set, a take home test or user tests for a teaching assistant to grade. The user interface engine 508 generates 808 a user interface that displays all conversation associated with a user. The statistics manager 504 generates 810 statistics that are associated with the conversation. The statistics are displayed in a user interface that is generated by the user interface engine 508. The user interface engine 508 receives 812 metadata relating to the MMR object from the user. The metadata includes, for example, comments on a discussion thread and a time that the comment was made. The timing is used by the conversation engine 502 to determine whether a discussion thread is still active. The user interface engine 508 transmits the metadata to the content management engine 155 via the communication unit 540. The content management engine 155 adds 814 the metadata to the metadata database 160.

Figure 9A:
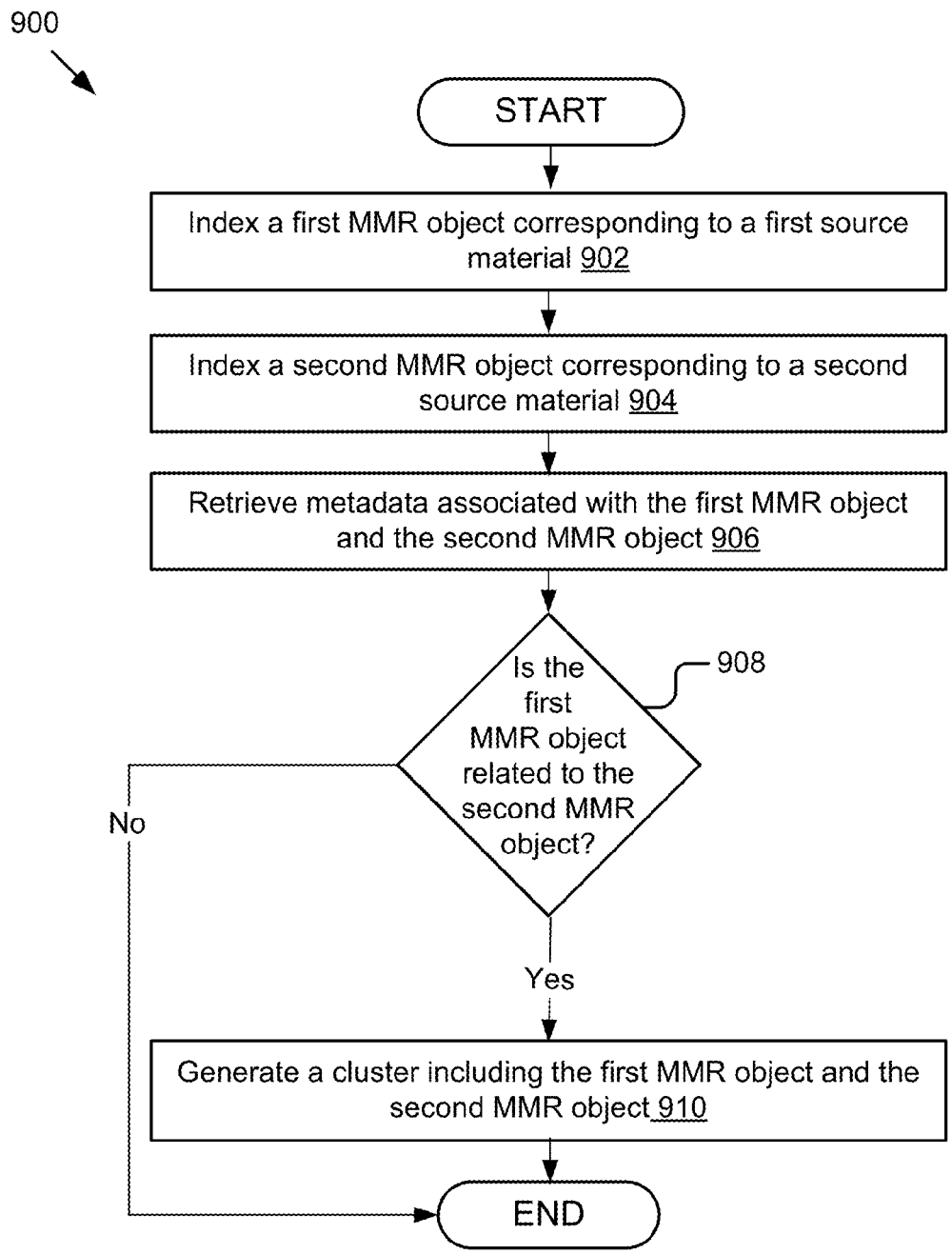
FIG. 9A and 9B are flow diagrams of different embodiments of a method for generating a cluster.

FIG. 9A is a flow diagram 900 of one embodiment of a method for generating a cluster of MMR objects using agglomerative clustering. The MMR database 105 indexes 902 a first MMR object corresponding to a first source material. The MMR database 105 indexes 904 a second MMR object corresponding to a second source material. The content management engine 155 retrieves 906 metadata associated with the first and the second MMR objects from the metadata database 160. The retrieved metadata includes information about the first and second MMR objects and information about the ways in which users interact with the first and second MMR objects from the social network server 101 if available. The content management engine 155 determines 908 whether the first MMR object is related to the second MMR object by applying one or more clustering algorithms to the retrieved metadata. The content management engine 155 generates 910 a cluster including the first and the second MMR objects responsive to determining that the first MMR object is related to the second MMR object. The agglomerative clustering method is helpful for updating the metadata database 160 with clusters. For example, each semester new books are added and the clusters need to be updated within the existing categories based on their metadata.

In one embodiment, the clustering algorithm generates a cluster with at least one of the following characteristics: a similarity vector that defines the uniqueness in the cluster pool (e.g. a cluster centroid in k-means), MMR objects, a state of the discussion group (active or non-active), metadata (comments, links, PDFs, chats and user connections) and a list of the users that have access to the resulting discussion group.

Figure 9B:
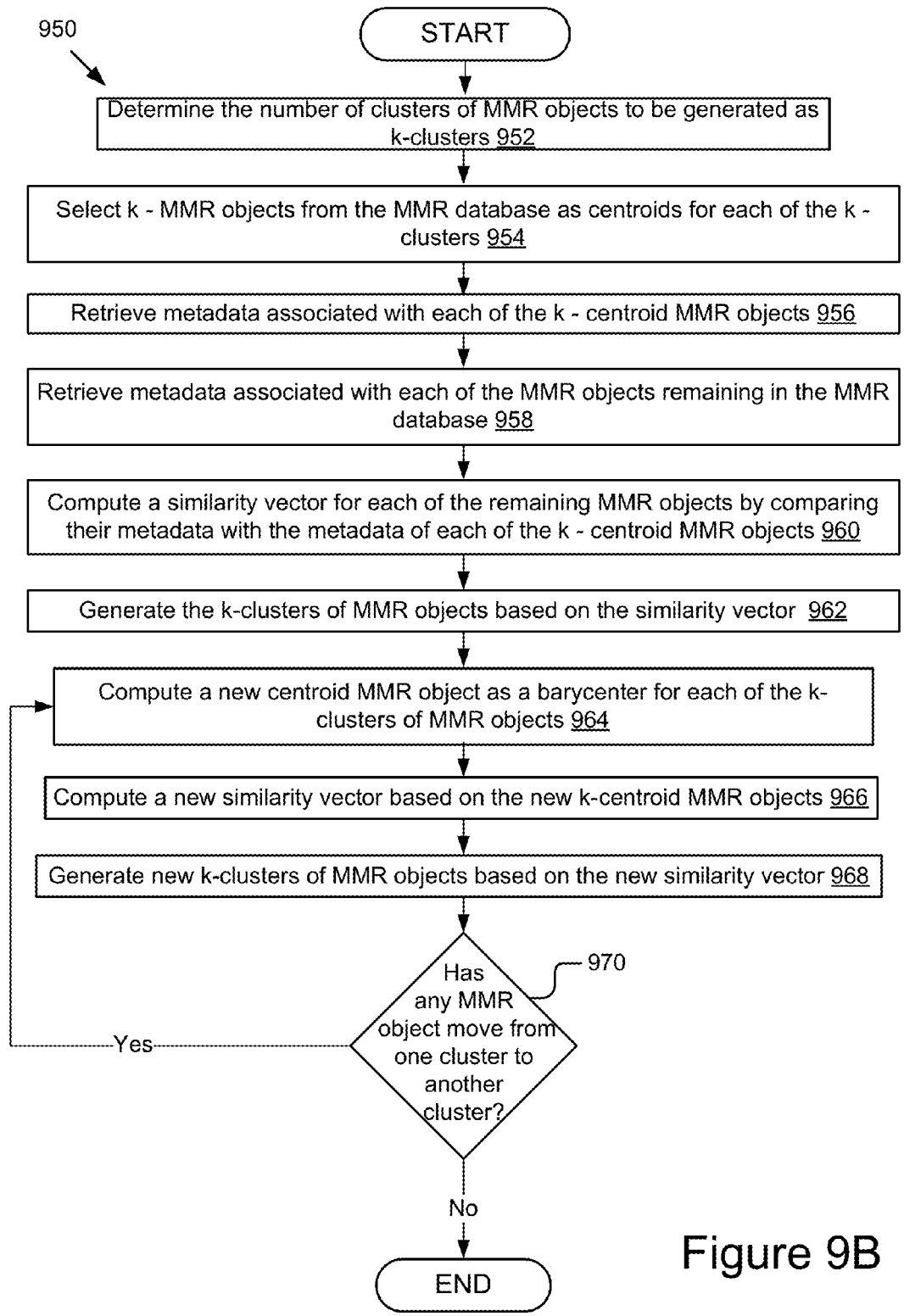

FIG. 9B is a flow diagram 950 of another embodiment of a method for generating a cluster of MMR objects using non-agglomerative clustering. The content management engine 155 determines 952 the number of clusters of MMR objects to be generated as k-clusters. The content management engine 155 then selects 954 k-MMR objects from the MMR database 105 as the centroids for each of the k-clusters. A person with ordinary skill in the art would recognize that the number of clusters and the centroids can be either automatically (randomly or according to a pre-determined number) selected or manually selected. The content management engine 155 retrieves 956 the metadata associated with each of the k-centroid MMR objects from the metadata database 160. The content management engine 155 also retrieves 958 the metadata associated with each of the MMR objects remaining (i.e., all the MMR objects apart from the k-centroid MMR objects) in the MMR database 105. The content management engine 155 then computes 960 a similarity vector for each of the remaining MMR objects by comparing their metadata with the metadata of each of the k-centroid MMR objects. The content management engine 155 generates 962 k-clusters of MMR objects based on the similarity vector. For example, the content management engine 155, based on the similarity vector, clusters an MMR object with the most similar centroid MMR object. The content management engine 155 computes 964 a new centroid MMR object as a barycenter for each of the k-clusters of MMR objects. The content management engine 155 then computes 966 a new similarity vector based on the new k-centroid MMR objects similar to step 960. The content management engine 155 generates 968 new k-clusters of MMR objects based on the new similarity vector similar to step 962. The content management engine 155 then compares the new k-cluster of MMR objects with the previously generated k-cluster of MMR objects to determine 970 if any MMR object has moved from one cluster to another cluster. Responsive to determining that an MMR object has moved from one cluster to another, the content management engine 155 repeats steps 964-960.

Figure 10:
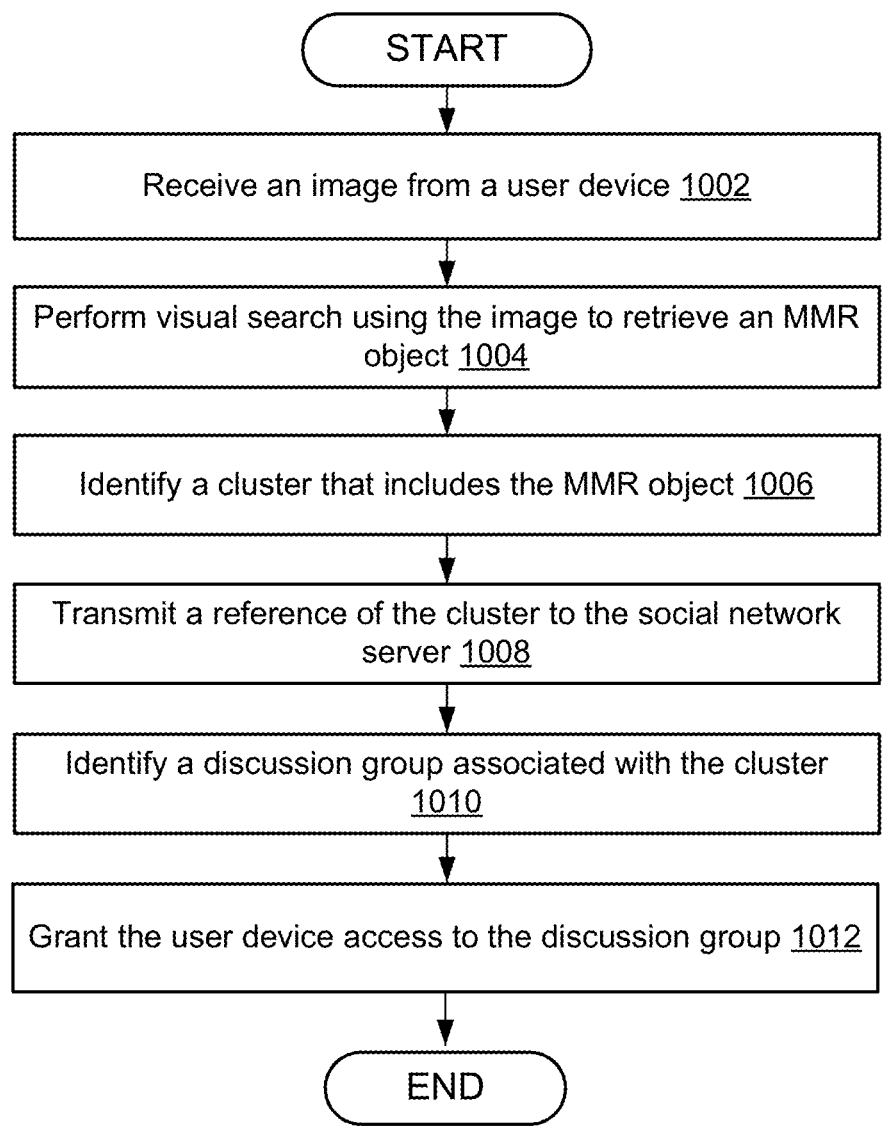
FIG. 10 is a flow diagram of one embodiment of a method for generating a discussion group based on a cluster group.

FIG. 10 is a flow diagram 1000 of one embodiment of a method for granting a user device 115 access to a discussion group based on a cluster. The MMR engine 103 receives 1002 an image from a user device 115. In one embodiment, the MMR engine 103 receives the image from an access module 113 on the user device 115a. The MMR engine 103 performs 1004 a visual search using the image to retrieve an MMR object from the MMR database 105. The MMR engine 103 identifies 1006 a cluster that includes the retrieved MMR object from the MMR database 105. The MMR engine 103 then transmits 1008 a reference of the cluster to the social network server 101. The conversation engine 502 receives the reference and identifies 1010 a discussion group associated with the cluster from the discussion information 568. The conversation engine 502 then grants 1012 the user device 115 access to the discussion group. In one embodiment, the user interface engine 508 transmits a notification to the access module 113 via the communication unit 540 inviting the user to join the discussion group.

Figure 11:
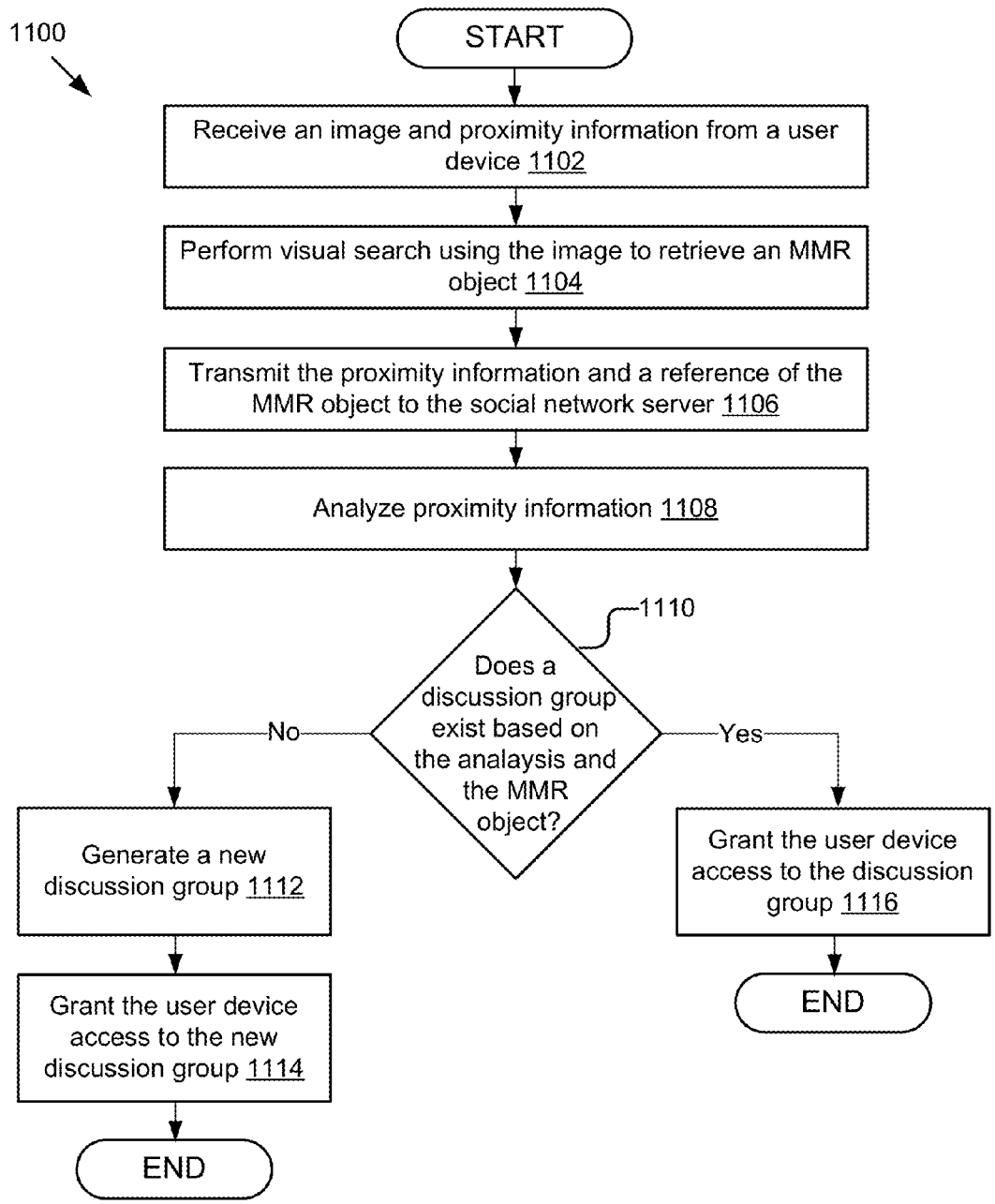
FIG. 11 is a flow diagram of one embodiment of a method for generating a discussion group based on proximity information.

FIG. 11 is a flow diagram 1100 of one embodiment of a method for granting a user device 115 access to a discussion thread based on proximity information. The MMR engine 103 receives 1102 an image and proximity information from a user device 115. In one embodiment, the MMR engine 103 receives the image and proximity information from an access module 113 on the user device 115a. The proximity information includes the location of the user device 115 and the time at which the image was captured with the user device 115. The MMR engine 103 performs 1104 a visual search using the image to retrieve an MMR object from the MMR database 105. The MMR engine 103 then transmits 1106 the proximity information and a reference of the MMR object to the social network server 101. The conversation engine 502 analyzes 1108 the proximity information and determines 1110 whether a discussion group exists as the discussion information 568 based on the analysis and the MMR object. For example, the conversation engine 502 determines whether a discussion group that was initiated by another user device 115 from the same location and within a given time frame of the received time information, exists as discussion information 568. Responsive to determining that a discussion group does not exist, the conversation engine 502 generates 1112 a new discussion group for the MMR object. The conversation engine 502 also grants 1114 the user device 115 access to the new discussion group. Responsive to determining that a discussion thread exists, the conversation engine 502 grants 1116 the user device 115 access to the existing discussion thread. In one embodiment, the user interface engine 508 transmits a notification to the access module 113 via the communication unit 540 inviting the user to join the discussion group.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method, the method comprising:
   receiving an image from a user device;
   searching, with one or more processors, the database of mixed media objects to identify and retrieve a mixed media object in which the image occurs;
   identifying, with the one or more processors, a cluster including the mixed media object in which the image occurs;
   transmitting, to a social network application, a reference to the cluster;
   determining, by the social network application, whether a conversation associated with the cluster exists in a social network; and
   responsive to an absence of the conversation, generating the conversation associated with the cluster in the social network.

2. The method of claim 1, wherein the mixed media object corresponds to a source material and the conversation includes a plurality of discussions that relate to the source material.

3. The method of claim 1, further comprising responsive to determining that the conversation exists, providing a user associated with the image with access to the conversation.

4. The method of claim 3, further comprising generating a user interface that provides the user with an option to perform at least one of submitting a new comment to the conversation, viewing all comments associated with the conversation and posting a reply to an existing comment.

5. The method of claim 1, further comprising generating statistics for the mixed media object that include at least one of a number of conversations associated with the mixed media object, a number of comments associated with the mixed media object and a number of users that are part of the conversation associated with the mixed media object.

6. The method of claim 1, further comprising retrieving metadata associated with the mixed media object and determining whether the conversation associated with the cluster exists based on the metadata.

7. The method of claim 6, further comprising generating a user interface that includes at least one of an image of a source material, a link associated with the mixed media object and a mechanism for enabling a user to input a comment.

8. A system comprising:
   one or more processors;
   a visual search engine stored on a memory and executable by the one or more processors, the visual search engine for receiving an image from a user device, searching the database of mixed media objects to identify and retrieve a mixed media object in which the image occurs, and identifying a cluster including the mixed media object in which the image occurs; and
   a social network application that is coupled to the visual search engine, the social network application for receiving, from the visual search engine, a reference to the cluster, determining whether a conversation associated with the cluster exists in a social network, and responsive to an absence of the conversation, generating the conversation associated with the cluster in the social network.

9. The system of claim 8, wherein the mixed media object corresponds to a source material and the conversation includes a plurality of discussions that relate to the source material.

10. The system of claim 8, wherein the social network application, responsive to determining that the conversation exists, provides a user associated with the image with access to the conversation.

11. The system of claim 8, wherein the social network application includes a user interface engine for generating a user interface that provides a user with an option to perform at least one of submitting a new comment to the conversation, viewing all comments associated with the conversation and posting a reply to an existing comment.

12. The system of claim 8, wherein the social network application includes a statistics manager for generating statistics for the mixed media object that include at least one of a number of conversations associated with the mixed media object, a number of comments associated with the mixed media object and a number of users that are part of the conversation associated with the mixed media object.

13. The system of claim 8, further comprising a content management engine coupled to the visual search engine and the social network application, the content management engine for transmitting metadata associated with the mixed media object to the social network application for determining whether the conversation associated with the cluster exists based on the metadata.

14. The system of claim 13, wherein the user interface engine generates a user interface that includes at least one of an image of a source material, a link associated with the mixed media object and a mechanism for enabling a user to input a comment.

15. The system of claim 8, wherein to search the database of mixed media objects the visual search engine is configured to extract features from the image.

16. A computer program product comprising a non-transitory computer useable medium including a computer readable program, wherein the computer readable program when executed on a computer causes the computer to:
- receive an image from a user device;
- search the database of mixed media objects to identify and retrieve a mixed media object in which the image occurs;
- identify a cluster including the mixed media object in which the image occurs;
- transmit a reference to the cluster to a social network application;
- determine, by the social network application, whether a conversation associated with the cluster exists in a social network; and
- responsive to an absence of the conversation, generate the conversation associated with the cluster in the social network.

17. The computer program product of claim 16, wherein the mixed media object corresponds to a source material and the conversation includes a plurality of discussions that relate to the source material.

18. The computer program product of claim 16, wherein responsive to determining that the conversation exists, the computer readable program causes the computer to provide a user associated with the image with access to the conversation.

19. The computer program product of claim 16, wherein the computer readable program further causes the computer to generate a user interface that provides a user with an option to perform at least one of submitting a new comment to the conversation, viewing all comments associated with the conversation and posting a reply to an existing comment.

20. The computer program product of claim 16, wherein the computer readable program further causes the computer to generate statistics for the mixed media object that include at least one of a number of conversations associated with the mixed media object, a number of comments associated with the mixed media object and a number of users that are part of the conversation associated with the mixed media object.

* * * * *